(12) United States Patent
Narendra et al.

(10) Patent No.: US 11,671,335 B2
(45) Date of Patent: Jun. 6, 2023

(54) FIRST NODE, SECOND NODE, AND METHODS PERFORMED THEREBY FOR MANAGING A NETWORK SLICE INSTANCE

(71) Applicant: Telefonaktiebolaget LM Ericsson (publ), Stockholm (SE)

(72) Inventors: Nanjangud Chandrasekhara Swamy Narendra, Bangalore (IN); Smita Behera, Bangalore (IN); Sai Chandrasekar, Chennai (IN); Swarup Kumar Mohalik, Bangalore (IN); Venkata Simhadri Nagender Yasalapu, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 250 days.

(21) Appl. No.: 16/770,235

(22) PCT Filed: Dec. 6, 2017

(86) PCT No.: PCT/IN2017/050573
§ 371 (c)(1),
(2) Date: Jun. 5, 2020

(87) PCT Pub. No.: WO2019/111267
PCT Pub. Date: Jun. 13, 2019

(65) Prior Publication Data
US 2020/0382386 A1 Dec. 3, 2020

(51) Int. Cl.
*H04L 41/0813* (2022.01)
*H04L 43/08* (2022.01)
(Continued)

(52) U.S. Cl.
CPC ...... *H04L 41/5009* (2013.01); *H04L 41/0813* (2013.01); *H04L 41/0893* (2013.01);
(Continued)

(58) Field of Classification Search
CPC . H04L 43/08; H04L 41/5009; H04L 41/0813; H04L 41/0893; H04L 41/0806
See application file for complete search history.

(56) References Cited

U.S. PATENT DOCUMENTS

2016/0124742 A1 5/2016 Rangasamy et al.
2017/0141973 A1 5/2017 Vrzic
(Continued)

FOREIGN PATENT DOCUMENTS

WO    WO 2017/080518 A1    5/2017

OTHER PUBLICATIONS

Extended European Search Report, European Patent Application No. 17934014.6, dated Aug. 2, 2021, 12 pages.
(Continued)

*Primary Examiner* — Lesa M Kennedy
(74) *Attorney, Agent, or Firm* — Sage Patent Group

(57) ABSTRACT

Provided is a method for managing a network slice instance (NSI) in a communications network. A first performance of the NSI is monitored by a first network slice subnet instance (NSSI) associated with the NSI. A first node obtains, from a second node, a request to monitor a second performance of the NSI. The second performance is of one or more microservices to provide data on a sector of the network. The first node determines, based on one or more requirements of the request, to perform one of: i) initiating (303) a creation of a second NSSI adapted to monitor the second performance based on the requirements, and ii) modifying, based on the requirements, an existing second NSSI, to monitor the second performance. The created or modified second NSSI being: a) independent from, and b) sharable with, the first subnet slice instance.

16 Claims, 12 Drawing Sheets

(51) Int. Cl.
   *H04L 43/0817* (2022.01)
   *H04L 41/5009* (2022.01)
   *H04W 4/70* (2018.01)
   *H04L 41/0893* (2022.01)
   *H04L 41/5051* (2022.01)

(52) U.S. Cl.
   CPC .......... *H04L 41/5051* (2013.01); *H04L 43/08* (2013.01); *H04L 43/0817* (2013.01); *H04W 4/70* (2018.02)

(56) References Cited

U.S. PATENT DOCUMENTS

| | | | |
|---|---|---|---|
| 2020/0050494 A1* | 2/2020 | Bartfai-Walcott | G06F 9/5083 |
| 2020/0059407 A1* | 2/2020 | Lu | H04L 41/0803 |
| 2020/0162345 A1* | 5/2020 | Vaishnavi | H04L 41/042 |
| 2020/0213937 A1* | 7/2020 | Yang | H04L 41/12 |

OTHER PUBLICATIONS

3GPP: "Telecommunication management; Study on management and orchestration of network slicing for next generation network (Release 14)", 3GPP TR 28.801 V1.1.0, Mar. 31, 2017 (XP055527122) 60 pages.

"Verizon Network Infrastructure Planning SDN-NFV Reference Architecture, Version 1.0," Feb. 1, 2016 (XP055695763), 220 pages.

Goto, Y., et al., "Draft supplement to Y.IMT2020 series "Standardization and open source activities related to network softwarization of IMT-2020" (for approval) Nippon Telegraph and Telephone Corporation Japan, TDxx (WP 1/13)" ITU-T Draft, Study Period 2017-2020; Study Group 13; vol. 21/13 Jul. 12, 2017 (XP044231579) 70 pages.

International Search Report and Written Opinion of the International Searching Authority, PCT/IN2017/050573, dated Mar. 26, 2018, 7 pages.

"3rd Generation Partnership Project; Technical Specification Group Services and System Aspects; Monitoring enhancements (Release 13)" 3GPP TR 23.789 V13.0.0 (Mar. 2015) 33 pages.

"3rd Generation Partnership Project; Technical Specification Group Services and System Aspects; Telecommunication management; Study on management and orchestration of network slicing for next generation network (Release 15)" 3GPP TR 28.801 V15.0.0 (Sep. 2017) 78 pages.

"3rd Generation Partnership Project; Technical Specification Group Services and System Aspects; Architecture enhancements to facilitate communications with packet data networks and applications (Release 15)" 3GPP TS 23.682 V15.2.0 (Sep. 2017) 122 pages.

* cited by examiner a)

b)

a)

b)

a)

b)

FIRST NODE, SECOND NODE, AND METHODS PERFORMED THEREBY FOR MANAGING A NETWORK SLICE INSTANCE

CROSS REFERENCE TO RELATED APPLICATIONS

This application is a 35 U.S.C. § 371 national stage application of PCT International Application No. PCT/IN2017/050573 filed on Dec. 6, 2017 the disclosure and content of which is incorporated by reference herein in its entirety.

TECHNICAL FIELD

The present disclosure relates generally to a first node and methods performed thereby for managing a network slice instance. The present disclosure also relates generally to a second node, and methods performed thereby for managing a network slice instance. The present disclosure further relates generally to a computer program product, comprising instructions to carry out the actions described herein, as performed by the first node, or the second node. The computer program product may be stored on a computer-readable storage medium.

BACKGROUND

Computer systems may comprise one or more nodes. A node may comprise one or more processors which, together with computer program code may perform different functions and actions, a memory, a receiving and a sending port. Nodes may be comprised in a telecommunications network.

Nodes within a telecommunications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The telecommunications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as wireless devices, with serving beams.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use WiFi for remote monitoring. These devices may collect data with the help of various existing technologies and then autonomously flow the data between other devices.

It is expected that in a near future, the population of IoT devices will be very large. Various predictions exist, among which one assumes that there will be >60000 devices per square kilometer, and another assumes that there will be 1000000 devices per square kilometer. A large fraction of these devices are expected to be stationary, e.g., gas and electricity meters, vending machines, etc.

Machine Type Communication (MTC)

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone. MTC involves communication in a wireless communication network to and/or from MTC devices, which communication typically may be of quite different nature and with other requirements than communication associated with e.g. conventional mobile phones and smart phones. In the context of and growth of the IoT it is evident that MTC traffic will be increasing and thus needs to be increasingly supported in wireless communication systems.

IoT is the main example of a use case for MTC in 5G. In the predominant scenarios, sensors may collect data about the environment and this data may be processed for decision making, which may be automated or manual. The data collection and processing may be performed through IoT platforms which expose the device semantics, configuration, data and analytics through a set of microservices. An IoT platform may be understood as a software product or collection of software products and/or services that provides the aforementioned device related information. Device semantics may be understood as the meaning behind the data from the device, e.g., 25 degrees Celsius refers to "temperature", 85% refers to "humidity", etc. A microservice may be understood as a software component that forms a part of the IoT platform. Diverse and multiple applications may then access the platform for the data, either raw or processed, for further processing, depending upon usage needs.

Existing solutions for monitoring IoT networks are built on existing 4G technology, which, given the large projected size of the future IoT infrastructures, render them incapable of meeting the challenges that lie ahead, such as large overhead of network resources, long latencies, and/or high energy consumption.

SUMMARY

It is an object of embodiments herein to improve the monitoring of the functioning of a communications network. It is a particular object of embodiments herein to improve the management of a network slice instance in a communications network.

According to a first aspect of embodiments herein, the object is achieved by a method, performed by a first node. The method is for managing a network slice instance in a communications network. A first performance of the network slice instance is monitored by a first network slice subnet instance associated with the network slice instance. The first node is comprised in the communications network. The first node obtains, from a second node comprised in the communications network, a request to monitor a second performance of the network slice instance. The second performance is of one or more microservices to provide data on a sector of the communications network. The first node also determines, based on one or more requirements of the obtained request, to perform one of: i) initiating a creation of a second network slice subnet instance adapted to monitor the second performance based on the one or more requirements, the second network slice subnet instance being: a) independent from the first network slice subnet instance, and b) sharable with the first subnet slice instance, and ii) modifying, based on the one or more requirements, an existing second network slice subnet instance, to monitor the second performance, the existing second network slice subnet instance being: a) independent from the first network slice subnet instance, and b) sharable with the first subnet slice instance.

According to a second aspect of embodiments herein, the object is achieved by a method, performed by the second node. The method is for managing the network slice instance in the communications network. The first performance of the network slice instance is monitored by the first network slice subnet instance associated with the network slice instance. The first network slice subnet instance is managed by the second node. The second node is comprised in the communications network. The second node provides, to the first node comprised in the communications network, the request to monitor the second performance of the network slice instance. The second performance is of the one or more microservices to provide data on the sector of the communications network. The second node obtains, from the first node, based on the one or more requirements of the provided request, one of: i) the initiated second network slice subnet instance adapted to monitor the second performance based on the one or more requirements, the second network slice subnet instance being: a) independent from the first network slice subnet instance, and b) sharable with the first subnet slice instance, and ii) the existing second network slice subnet instance, modified, based on the one or more requirements, to monitor the second performance, the modified second network slice subnet instance being: a) independent from the first network slice subnet instance, and b) sharable with the first subnet slice instance.

According to a third aspect of embodiments herein, the object is achieved by the first node, configured to manage the network slice instance in the communications network. The first performance of the network slice instance is configured to be monitored by the first network slice subnet instance configured to be associated with the network slice instance. The first node is configured to be comprised in the communications network. The first node is further configured to obtain, from the second node configured to be comprised in the communications network, the request to monitor the second performance of the network slice instance. The second performance is configured to be of the one or more microservices to provide data on the sector of the communications network. The first node is also configured to determine, based on the one or more requirements of the request configured to be obtained, to perform one of: i) initiate the creation of the second network slice subnet instance adapted to monitor the second performance based on the one or more requirements, the second network slice subnet instance being: a) independent from the first network slice subnet instance, and b) sharable with the first subnet slice instance, and ii) modify, based on the one or more requirements, the existing second network slice subnet instance, to monitor the second performance, the existing second network slice subnet instance being: a) independent from the first network slice subnet instance, and b) sharable with the first subnet slice instance.

According to a fourth aspect of embodiments herein, the object is achieved by the second node, configured to manage the network slice instance in the communications network. The first performance of the network slice instance is configured to be monitored by the first network slice subnet instance configured to be associated with the network slice instance. The first network slice subnet instance is configured to be managed by the second node. The second node is configured to be comprised in the communications network. The second node is further configured to provide, to the first node configured to be comprised in the communications network, the request to monitor the second performance of the network slice instance. The second performance is of one or more microservices to provide data on the sector of the communications network. The second node is also configured to obtain, from the first node, based on the one or more requirements of the request configured to be provided, one of: i) the initiated second network slice subnet instance adapted to monitor the second performance based on the one or more requirements, the second network slice subnet instance being configured to be: a) independent from the first network slice subnet instance, and b) sharable with the first subnet slice instance, and ii) the existing second network slice subnet instance, modified, based on the one or more requirements, to monitor the second performance, the modified second network slice subnet instance being configured to be: a) independent from the first network slice subnet instance, and b) sharable with the first subnet slice instance.

According to a fifth aspect of embodiments herein, the object is achieved by a computer program, comprising instructions which, when executed on at least one processor, cause the at least one processor to carry out the method performed by the first node.

According to a sixth aspect of embodiments herein, the object is achieved by a computer-readable storage medium, having stored thereon the computer program, comprising instructions which, when executed on at least one processor, cause the at least one processor to carry out the method performed by the first node.

According to a seventh aspect of embodiments herein, the object is achieved by a computer program, comprising instructions which, when executed on at least one processor, cause the at least one processor to carry out the method performed by the second node.

According to an eighth aspect of embodiments herein, the object is achieved by a computer-readable storage medium, having stored thereon the computer program, comprising instructions which, when executed on at least one processor, cause the at least one processor to carry out the method performed by the second node.

By the first node determining, based on one or more requirements of the obtained request, to initiate the creation of the second network slice subnet instance or to modify the existing second network slice subnet instance, to monitor the second performance, the second network slice subnet instance being independent from, and sharable with the first subnet slice instance, the first node enables to provide an automatic and dynamic method to monitor, on-demand, special application or services, in a way that is tailored to the specific requirements of the demanded monitoring task, minimizing the processing resources involved, and the end-to-end latency of the monitoring. Therefore, over- or under-allocation of resources leading to resource waste of the communications network is avoided, and the performance of the communications network is improved.

BRIEF DESCRIPTION OF THE DRAWINGS

Examples of embodiments herein are described in more detail with reference to the accompanying drawings, according to the following description.

DETAILED DESCRIPTION

Figure 1:
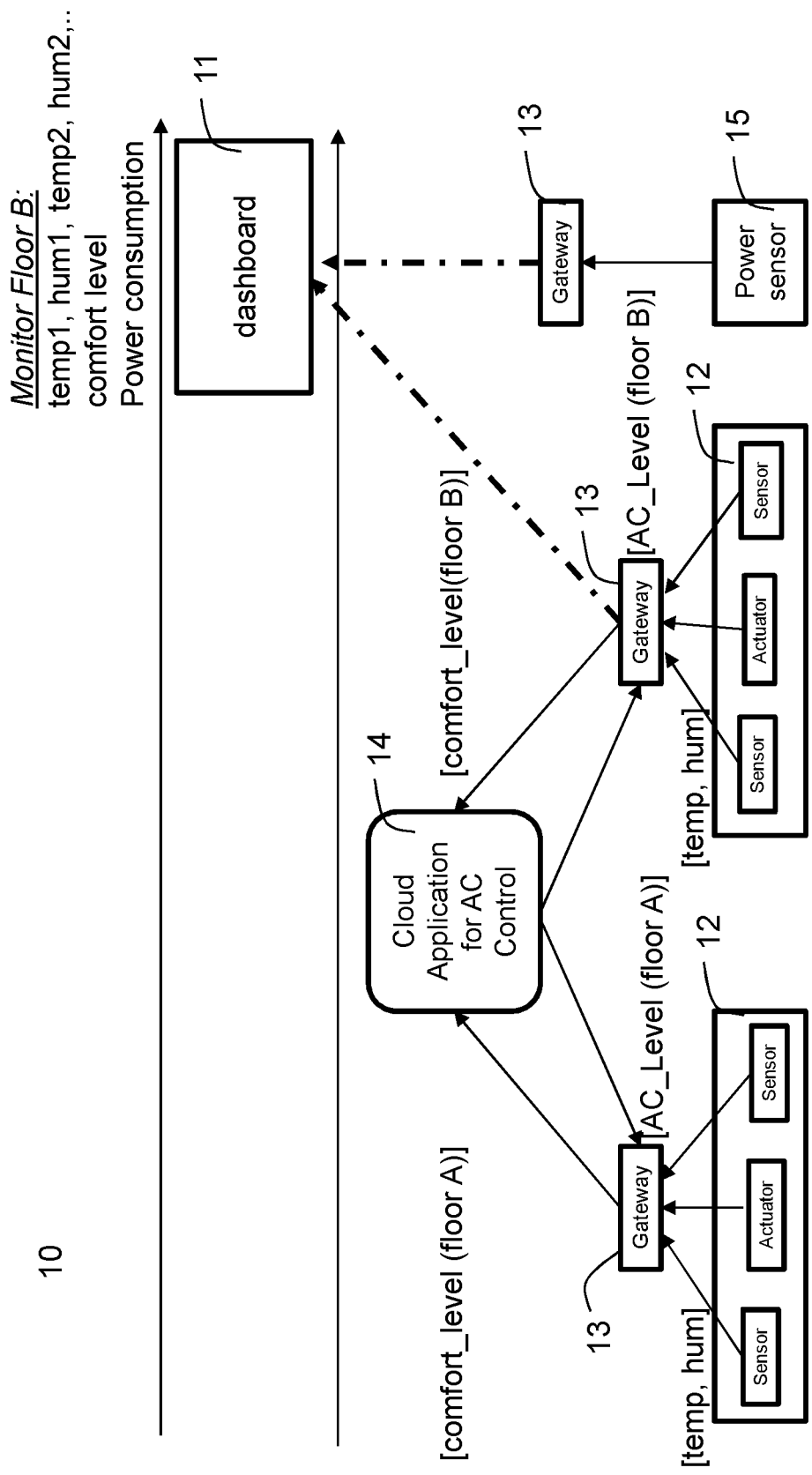
FIG. 1 is a schematic diagram illustrating the components of an IoT platform for a Building Automation System.

As part of the development of embodiments herein, a problem with exiting methods will first be identified and discussed with an illustrative example, a Building Automation System (BAS) 10, such as that illustrated in FIG. 1. FIG. 1 depicts the components of the IoT platform for the example BAS 10, and a monitoring application Building Comfort Manager (BCM) accessed through a dashboard 11.

In this particular example, the BAS comprises IoT sensors and actuators 12. The sensors measure the temperature and humidity of the rooms, and send these data through WiFi to gateways 13 situated in each floor. The gateways 13 compute the floor level comfort level as a function of temperature and humidity, and send these values in the north-bound communications to a cloud application 14 which computes the Air Conditioning (AC) level required for each floor, and send the actuation commands to set the AC level that may be required through the gateways 13 to the IoT enabled AC controllers, that is the actuators comprised in the sensors and actuators 12. There is also a sensor 15 that reports the consumed electrical power in the building through a 3GPP gateway 13. The IoT platform provides a service that tells which data/metadata is available for the IoT platform and the Universal Resource Indicators (URI) to access them. A BCM dashboard 11 may monitor different floors in the BAS by accessing the comfort levels, temperatures, humidity values and power consumption from the 3GPP gateways.

The IoT platform may be implemented as a so-called 5G network slice. A network slice may be understood as a logical network created on top of a common shared physical infrastructure. The network slice may be optimized to serve a specific purpose.

Provider Slice

In the example of FIG. 1, a 5G slice may be assigned to the BAS, and may perform the following allocations. For ease of reference, the network slice corresponding to an IoT platform may be referred to herein as a "Provider Slice". It may reserve: 1) WiFi bandwidth for the sensor data including the state of the AC controllers, 2) computation resources on the gateway (e.g., a task), 3) radio and Internet Protocol (IP) bandwidth till a cloud datacenter, 4) computation resources in the datacenter for the collation of comfort levels, and state of AC controllers, and 5) computation of the AC configuration parameters.

Consumer Slice

A Building Comfort Manager (BCM), that is, an orchestration function in the context of a Building Automation System (BAS) which may implement policies and control functions based on IoT inputs, may at some point want to monitor the BAS, in particular, functions such as the comfort levels of each floor, average comfort levels and the power consumption in the building and the AC settings. The BCM may, for example, monitor the temperature levels in the BAS and adjust them to ensure that the people in the building find the temperature comfortable. The functions created for the monitoring application(s) may be referred to herein as Consumer Slices. A "Consumer Slice" may be understood to refer to a subnet dynamically created within the overall Provider Slice, and whose function is to monitor the Provider Slice.

The BCM may have different modes of operation. In different modes, it may require different sets of data from BAS. For example, a) the BAM dashboard may have to access the comfort levels which it may get from the 3GPP gateways or from the input to the cloud aggregator application, b) the power consumption data from the building central may have to be sent directly from the gateways, c) the AC settings may have to be sent from the cloud application output or from the floor gateways, d) further, it may need an aggregator service to calculate the average of the comfort levels and a dashboard drawing service. An aggregator may be understood as a function implemented as a software or hardware to compute aggregates from individual readings from IoT devices, to compute a specific cumulative or aggregate value for a time series of data e.g., an average or a sum for a specific time period, a standard deviation for a cumulative data spread over a month, etc.

Given these different modes of operation and the constraints each request may have in terms of e.g., type an amount of requested information, the provider slice for BAS may need to:

1. depending on the requested service, point the input requests to the right sources, e.g., the gateway or the aggregator, which may reduce the bandwidth requirements, and the end-to-end latency for the monitoring application (BCM);

2. scale up or down the service instances in case of multiple instances like BCM and large number of requests. An instance may be understood as a single service created for a user. To scale up or down the service instances, the provider slice for BAS may consider the dynamism coming from:

a) requirements of the consumer slice subnet/service— For example, if a manager wants to see the comfort level of a floor, he may need to only access the floor gateway at that time, and the slice may ignore the rest, which will reduce the end-to-end latency because there is no need to get all the data necessary for all the objects at this time;

b) possible reconfiguration of the provider slice—Reconfiguration may be understood as any modification done to the provider slice, e.g., increasing its network bandwidth capacity, adding additional sensors from which it will receive and process data, etc.

Network slicing is a promising tool to monitor IoT networks. However, currently, there is no known method for dynamic on-demand monitoring for special application/ service. Furthermore, there are no known methods for generating the consumer slice adapted to the service monitoring requirement. In other words, there is no known method to dynamically change monitoring functions, that is, to adapt monitoring parameters, based on data flow. In sum, there are no known solutions within 5G which leverage the slicing techniques to provide the dynamic creation and allocation of subnets for consumer slices.

Several embodiments are comprised herein, which address these problems of the existing methods. The 3GPP standards (TR 28.801) provide 5G slicing techniques including the concept of slice subnets (NSS—network slice subnet). Embodiments herein build upon this to provide a system and method to address the problems above. Embodiments herein may be understood to relate to systems and methods which enhance a provider slice to address the three points mentioned above. Embodiments herein may consider those applications which access an IoT platform only to read the sensor data. These applications may be referred to herein as monitoring applications.

These monitoring applications or functions may be implemented as a Network Slice Subnet or an independent service that may interact with the underlying 5G Network Slices. Since the number and nature of monitoring applications may vary, the accesses to the platform may be dynamically processed to provide the right data and right scaling so as to optimize the resources. Otherwise, the provider slice may be over- or under-allocated leading to resource waste, which may be also referred to as a "crunch".

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Although terminology from Long Term Evolution (LTE)/ 5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, the terms used herein may need to be reinterpreted in view of possible terminology changes in future radio access technologies.

Figure 2:
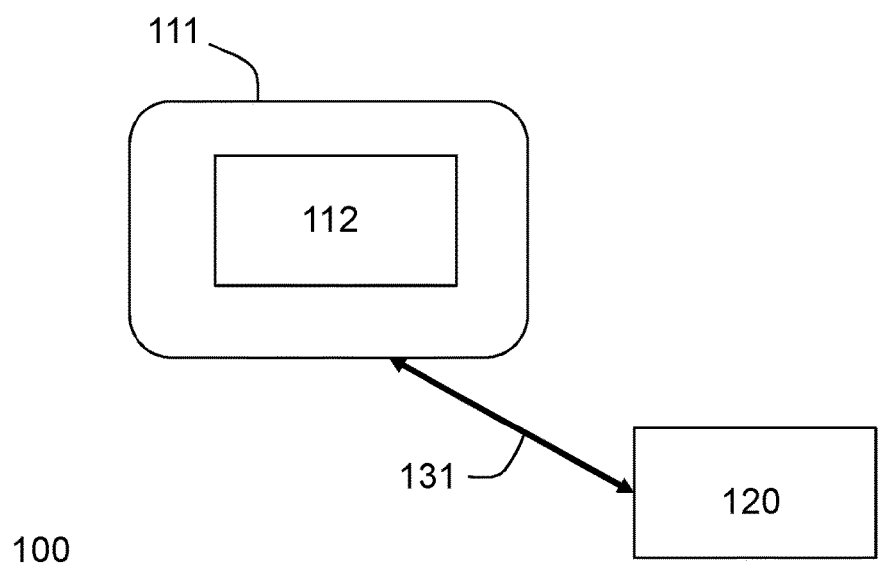
FIG. 2 is a schematic diagram illustrating two non-limiting examples in a) and b), respectively, of a communications network, according to embodiments herein.
Figure 2:
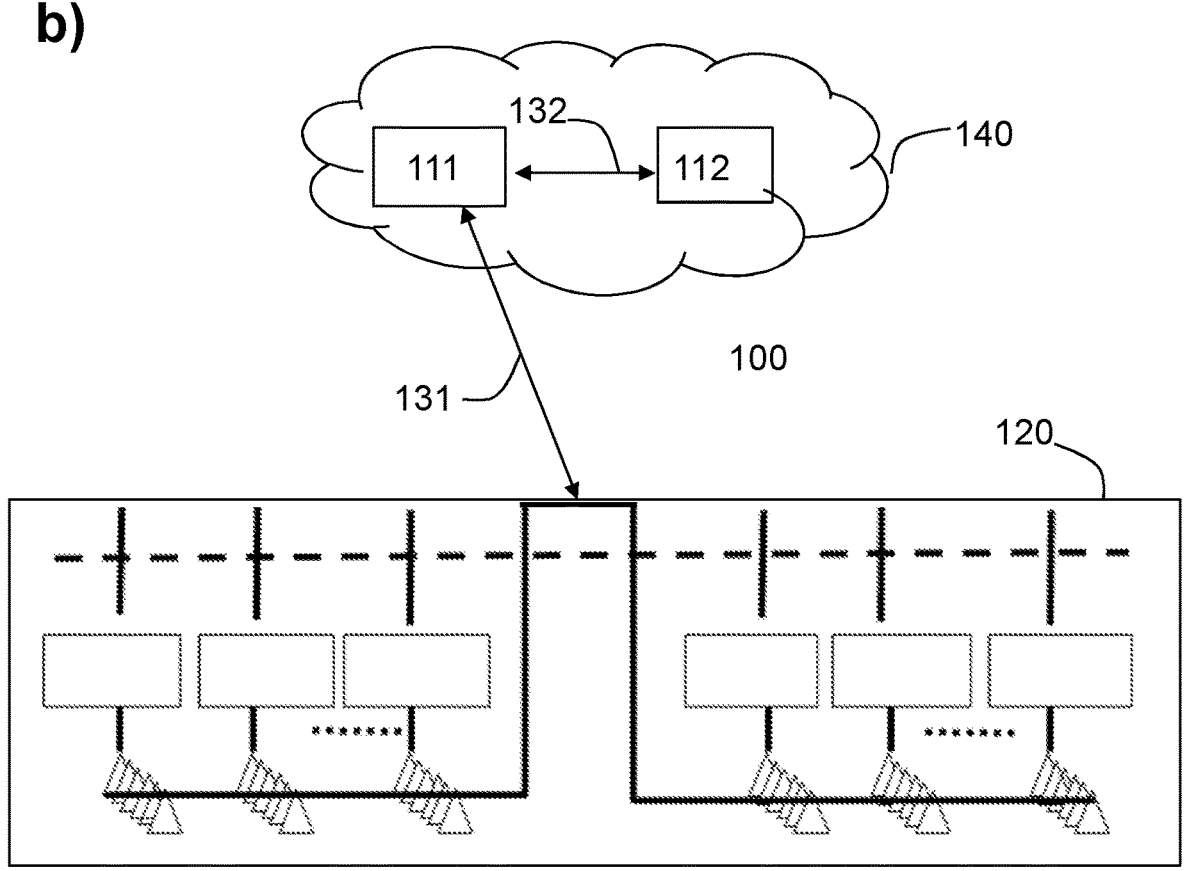

FIG. 2 depicts two non-limiting examples, in panels "a" and "b", respectively, of a communications network 100, in which embodiments herein may be implemented. In some example implementations, such as that depicted in the non-limiting example of FIG. 2a, the communications network 100 may be a computer network. In other example implementations, such as that depicted in the non-limiting example of FIG. 2b, the communications network 100 may be implemented in a telecommunications network 100, sometimes also referred to as a cellular radio system, cellular network or wireless communications system. The telecommunications network 100 may for example be a network such as 5G system, or Next Gen network. In some examples, the telecommunications network 100 may be a non-cellular system, comprising network nodes which may serve receiving nodes, such as wireless devices, with serving beams. This may be a typical case in a 5G network using New Radio (NR). The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as 6LowPAN, Bluetooth, or any cellular network or system.

The communications network 100 comprises a plurality of nodes, whereof a first node 111, and a second node 112 are depicted in FIG. 2. Each of the first node 111, and the second node 112 may be understood, respectively, as a first computer system, and a second computer system. In some examples, each of the first node 111 and the second node 112 may be implemented, as depicted in the non-limiting example of FIG. 2b, as a standalone server in e.g., a host computer in the cloud 140. Each of the first node 111, and the second node 112 may in some examples be a distributed node or distributed server, with some of their respective functions being implemented locally, e.g., by a client manager, and some of its functions implemented in the cloud 140, by e.g., a server manager. Yet in other examples, each of the first node 111 and the second node 112 may also be implemented as processing resources in a server farm. Each of the first node 111 and the second node 112 may be under the ownership or control of a service provider, or may be operated by the service provider or on behalf of the service provider.

In some embodiments the first node 111 and the second node 112 may be co-located or be the same device, as depicted in the example of FIG. 2a. All the possible combinations are not depicted in FIG. 2 to simplify the Figure.

When comprised in the communications network 100, any of the first node 111 and the second node 112, may be a network node such as a Remote Radio Unit (RRU), a Remote Radio Head (RRH), a multi-standard BS (MSR BS), a core network node, e.g., a Mobility Management Entity (MME), Self-Organizing Network (SON) node, a coordinating node, Minimization of Driving Test (MDT) node, etc. . . . In some particular examples, any of the first node 111 and the second node 112 may be Home Subscriber Server (HSS) or a Home Location Register (HLR) of a core network. In some examples any of the first node 111 and the second node 112 may be an Application Programming Interface (API) for service access in the core network.

The communications network 100 further comprises a sector 120, that is a part of its infrastructure. The sector 120 of the communications network 100 may typically comprise an infrastructure or wireless devices, typically a group of IoT sensors. Any of the wireless devices comprised in the communications network 100 may be a wireless node such as a 5G UE, or a UE which may also be known as being enabled to communicate voice and/or data, via the RAN, with another entity, such as a server, a laptop, a Machine-to-Machine (M2M) device, device equipped with a wireless interface, such as a printer or a file storage device, modem, or any other radio network unit capable of communicating over a wired or radio link in a communications system. Any of the wireless devices comprised in the communications network 100 is enabled to communicate wirelessly in the communications network 100. The communication may be performed e.g., via a RAN and possibly one or more core networks, comprised within the communications network 100.

The communications network 100 may cover a geographical area which, which in some embodiments may be divided into cell areas, wherein each cell area may be served by a radio network node, which is not depicted in FIG. 2b, although, one radio network node may serve one or several cells. The radio network node may be a radio network node, such as e.g., a gNB. That is, a transmission point such as a radio base station, for example an eNB, an eNodeB, or a Home Node B, a Home eNode B or any other network node capable to serve a wireless device, such as a user equipment or a machine type node in the communications network 100. The radio network node may be of different classes, such as, e.g., macro eNodeB, home eNodeB or pico base station, based on transmission power and thereby also cell size. In some examples wherein the communications network 100 may be a non-cellular system, the radio network node may serve receiving nodes with serving beams. The radio network node may support one or several communication technologies, and its name may depend on the technology and terminology used. Any of the radio network nodes that may be comprised in the communications network 100 may be directly connected to one or more core networks.

The first node 111 is configured to communicate within the communications network 100 with the sector 120 over a first link 131, e.g., a radio link, an infrared link, or a wired link. The first link 131 may be understood to be comprised of a plurality of individual links. The first node 111 is configured to communicate within the communications network 100 with the second node 112 over a second link 132, e.g., another radio link or another wired link.

Any of the first link 131 and the second link 132 may be a direct link or it may go via one or more computer systems or one or more core networks in the communications network 100, which are not depicted in FIG. 2, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 2.

In general, the usage of "first", "second", "third", and/or "fourth" herein may be understood to be an arbitrary way to denote different elements or entities, and may be understood to not confer a cumulative or chronological character to the nouns they modify.

Figure 3:
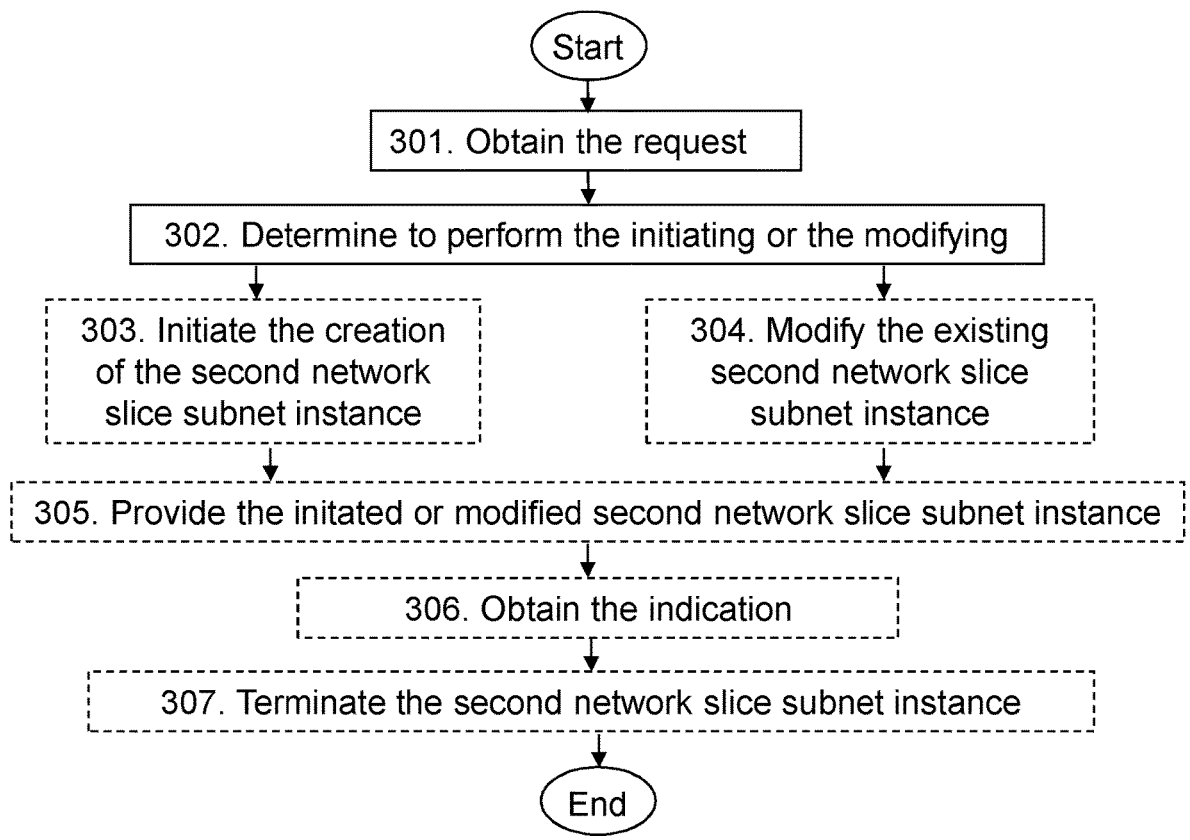
FIG. 3 is a flowchart depicting embodiments of a method in a first node, according to embodiments herein.

Embodiments of method performed by the first node 111, will now be described with reference to the flowchart depicted in FIG. 3. The method may be understood to be for managing a network slice instance in a communications network 100. The first node 111 is comprised in the communications network 100.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

Action 301

The course of operations of the sector 120 may be monitored by a network slice instance. A network slice instance may be understood as a set of network functions and the resources for these network functions which are arranged and configured, forming a complete logical network to meet certain network characteristics, as e.g., defined in 3GPP TR 28.801 v 15.0.0. As described before this network slice instance, also referred to herein as provider slice, may perform all the allocations of radio, computation resources, and some computation of parameters associated with the operations of the section 120, e.g., the computation of AC configuration parameters. The sector 120 of the communications network 100 may comprise, in some embodiments, Internet-of-Things sensors.

A first performance of the network slice instance is monitored by a first network slice subnet instance associated with the network slice instance. A network slice subnet instance may be understood as a set of network functions and the resources for these network functions which are arranged and configured to form a logical network, as e.g., defined in 3GPP TR 28.801 v 15.0.0. As described before this network slice subnet instance, also referred to herein as consumer slice, may perform some first monitoring functions of the sector 120, such as monitoring comfort levels in each floor of a building, averaging comfort levels, power consumption in the building, and AC settings. This first group of functions is what is referred to herein as a first performance. This may be any performance, however, typically, this may be performance of functions that are normally carried out in the course of normal operation such as latency, loss of function or operability.

During the course of operation of the sector 120, a specific additional need may arise to monitor the operation in the sector 120. This may be, for example, a need to detect a fault in a sensor comprised in the sector 120, monitoring the temperature in a specific room in a building, or checking the level of air conditioning used in a particular floor of a building. When such an additional, specific need arises for on-demand monitoring of the sector 120, it may be understood that the specific operation is equivalent to a second performance of the network slice instance. Therefore, in this Action 301, the first node 111 obtains, from the second node 112 comprised in the communications network 100, a request to monitor a second performance of the network slice instance. The second performance is of one or more microservices to provide data on the sector 120 of the communications network 100.

The second node 112 may be understood to be responsible for the management and orchestration of the network slice instance, and for communicating with a node responsible for the management of the network slice subnet management function.

A request may be, for example, an On-board Network Service Descriptor (NSD) or an Update NSD operation as specified or described in ETSI GS NFV-IFA 013 V2.1.1, and ETSI GS NFV-MAN 001 V1.1.1.

Obtaining, in the examples wherein the first node 111 and the second node 112 may be separate nodes, may comprise receiving, e.g., via the second link 132.

Action 302

The request obtained by the first node 111 comprises one or more requirements. For example, an Update Virtual Network Function (VNF) Forwarding Graph message, as described in ETSI GS NFV-MAN 001 V1.1.1, may be generated based the on one or more requirements which may be associated with any input microservices and other aggregator functions that may be required to monitor the second performance. In this Action 302, the first node 111 determines, based on the one or more requirements of the obtained request, to perform one of:

i. initiating a creation of a second network slice subnet instance adapted to monitor the second performance based on the one or more requirements, the second network slice subnet instance being: a) independent from the first network slice subnet instance, and b) sharable with the first subnet slice instance, and ii. modifying, based on the one or more requirements, an existing second network slice subnet instance, to monitor the second performance, the existing second network slice subnet instance being: a) independent from the first network slice subnet instance, and b) sharable with the first subnet slice instance.

In other words, based on the one or more requirements of the obtained request, the first node 111 may decide whether an already existing network slice subnet instance may be adapted, that is, changed, to monitor the second performance, or whether the first node 111 may need to create a new network slice subnet instance. Creation of a new network slice subnet instance may be triggered when adaptation of an existing network slice subnet instance may not be possible.

Initiating creating may be understood as performing the creation itself, or triggering the creation by another node in communication with the first node 111, e.g., in a distributed node environment.

Sharable may be understood as belonging in the same network slice subnet.

Independent may be understood as being a separate network slice subnet instance within the overall provider network slice instance.

The first node 111 may, as part of the determining 302, intercept the one or more requirements of the obtained request and identify the sharable subnet slices with microservices that may be shared. The first node 111 may also check the authorization to filter the list of microservices, and, for the authorized microservices, it may check the scale up requirements and perform the appropriate scaling up.

Action 303

According to the foregoing, in some embodiments, the first node 111 may, in this Action 303, initiate the creation of the second network slice subnet instance based on the one or more requirements of the obtained request.

The first node 111 may create the second network slice subnet instance comprising smaller subnet slices taking into account the one or more requirements, e.g., Key Performance Indicator (KPI) requirements.

Action 304

In other embodiments, the first node 111 may, in this Action 304, modify the existing second network slice subnet instance based on the one or more requirements of the obtained request.

Action 305

In other embodiments, the first node 111 may, in this Action 305, provide, to the second node 112, one of: a) the initiated second network slice subnet instance, and b) the modified existing second network slice subnet instance.

That is, for example, the first node 111 may add the created second network slice subnet instance to the first network slice subnet instance, that is, the consumer slice.

Providing, in the examples wherein the first node 111 and the second node 112 may be separate nodes, may comprise sending, e.g., via the second link 132.

Action 306

Once the monitoring has been completed, the first node 111 may, in this Action 306, obtaining an indication from the second node 112 indicating that monitoring of the second performance has been completed.

The first node 111 may obtain, e.g., receive the indication, via the second link 132.

The indication may be, for example, an acknowledgement message indicating the completion of monitoring.

Action 307

After the first node 111 may have received the indication that the monitoring of the second performance has been completed, the first node 111 may, in this Action 307, terminate, based on the obtained indication, one of: a) the created second network slice subnet instance, and b) the modified existing second network slice subnet instance. Terminating may be understood as reconfiguring, that is, tearing down, the second network slice subnet instance.

Figure 4:
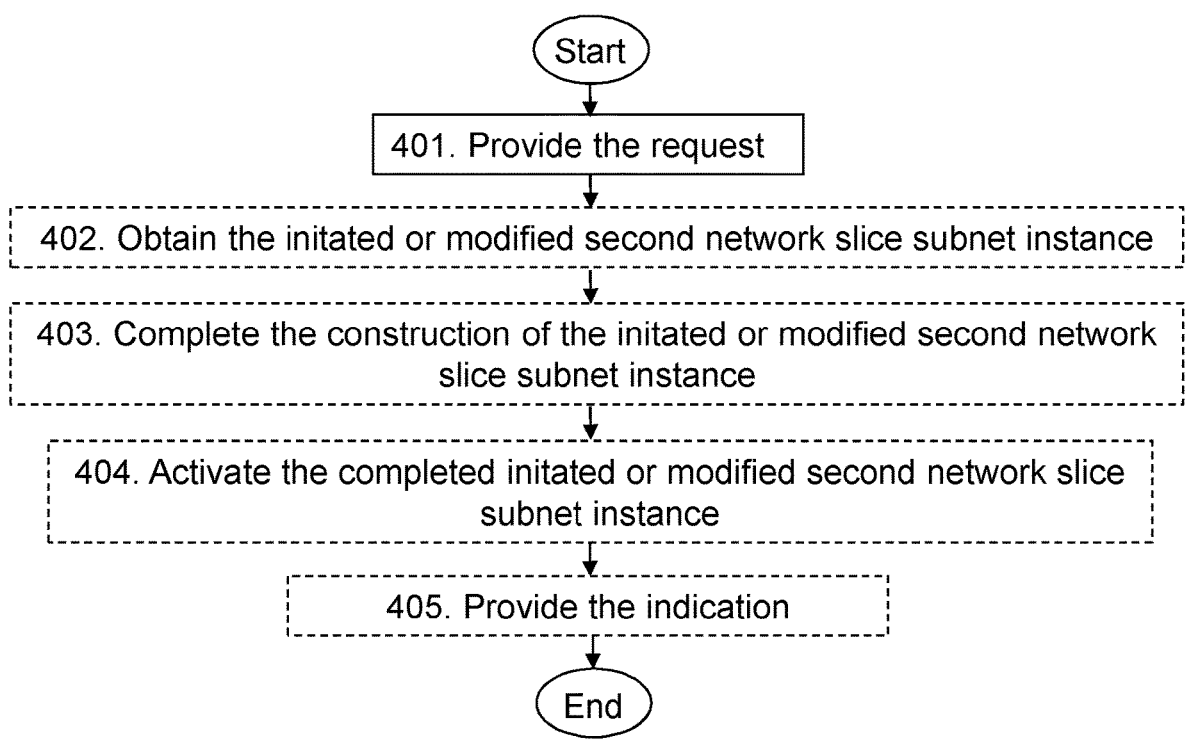
FIG. 4 is a flowchart depicting embodiments of a method in a second node, according to embodiments herein.

Embodiments of a method performed by the second node 112, will now be described with reference to the flowchart depicted in FIG. 4. The method is for managing the network slice instance in the communications network 100. The first performance of the network slice instance is monitored by the first network slice subnet instance associated with the network slice instance. The first network slice subnet instance, which is also referred to herein as the consumer slice, is managed by the second node 112. The second node 112 is comprised in the communications network 100.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed boxes.

The detailed description of some of the following corresponds to the same references provided above, in relation to the actions described for the first node 111, and will thus not be repeated here to simplify the description. For example, the sector 120 of the communications network 100 may comprise IoT sensors.

Action 401

Whenever, during the course of operation of the sector 120, the specific additional need to monitor the operation in the sector 120 discussed earlier may arise, the second node 112 in this Action 401, provides to the first node 111 comprised in the communications network 100, the request to monitor the second performance of the network slice instance. The second performance is of the one or more microservices to provide data on the sector 120 of the communications network 100.

Providing, in the examples wherein the first node 111 and the second node 112 may be separate nodes, may comprise sending, e.g., via the second link 132.

Action 402

After providing the request to the first node 111, the second node 112, in this Action 402, obtains, from the first node 111, based on one or more requirements of the provided request, one of:

i. the initiated second network slice subnet instance adapted to monitor the second performance based on the one or more requirements, the second network slice subnet instance being: a) independent from the first network slice subnet instance, and b) sharable with the first subnet slice instance, and ii. the existing second network slice subnet instance, modified, based on the one or more requirements, to monitor the second performance, the modified second network slice subnet instance being: a) independent from the first network slice subnet instance, and b) sharable with the first subnet slice instance.

Obtaining, in the examples wherein the first node 111 and the second node 112 may be separate nodes, may comprise receiving, e.g., via the second link 132. That the obtaining in this Action 402 is based on the one or more requirements may be understood to mean that depending on the one or more requirements, the first node 111 may have determined to create the second network slice subnet instance or to modify the existing second network slice subnet instance. Hence the type of network slice subnet instance the second node 111 may obtain in this Action 402 may depend on the decision by the first node 111.

The second network slice subnet instance or the existing second network slice subnet instance may be understood to be "obtained" when it is made available once the first node 111 creates or modifies the second network slice subnet instance.

Action 403

In some embodiments, the second node 112 may, in this Action 403, complete construction, based on the one or more requirements of the provided request, one of: a) the initiated second network slice subnet instance and b) the modified second network slice subnet instance.

Action 404

The second node 112 may, in this Action 404, activate, based on the one or more requirements of the provided request, the one of: a) the completed initiated second network slice subnet instance and b) the completed modified second network slice subnet instance.

That the activating in this Action 404 may be based on the one or more requirements may be understood to mean that depending on the one or more requirements, the first node 111 may have determined to create the second network slice subnet instance or to modify the existing second network slice subnet instance. Hence the type of network slice subnet instance the second node 111 may activate in this Action 402 may depend on the type provided by the first node 111.

To activate may be understood as starting the second network slice subnet instance by provisioning resources for it to start operating.

Action 405

In some embodiments, the second node 112 may, in this Action 405, provide, based on the data provided by the activated one of: a) the completed initiated second network slice subnet instance and b) the completed modified second network slice subnet instance, the indication to the first node 111. The indication indicates that monitoring of the second performance has been completed.

The methods just described as being implemented by the first node 111 and the second node 112 will now be described in further detail in the next three sections, in relation to FIG. 5, FIG. 6 and FIG. 7, with particular non-limiting examples wherein the communications network 100 is a 5G Network, and wherein the sector 120 of the communications network 100 comprises IoT sensors.

Figure 5:
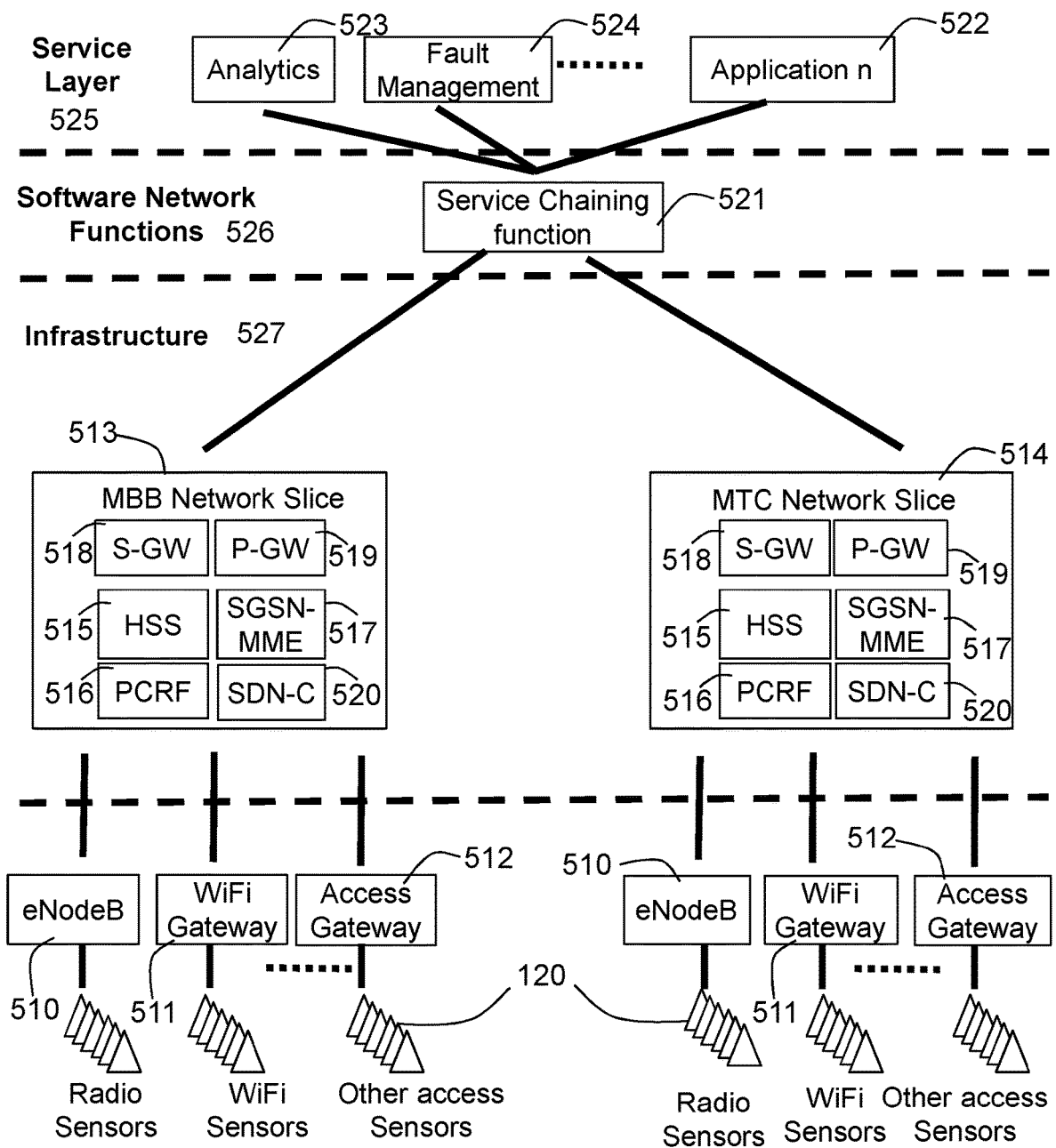
FIG. 5 is a schematic diagram illustrating an example of a 5G network wherein embodiments herein may be implemented.

FIG. 5 depicts a non-limiting example of such a 5G network wherein embodiments herein may be implemented. In this network, the devices in the sector 120, e.g., radio sensors, WiFi sensors or other access sensors, are connected to the communications network 100 through different access mechanisms. Such access mechanisms, as depicted may be, respectively, radio stations, e.g., eNodeBs 510, WiFi Gateways 511 or other Access Gateways 512.

In order to cater to multiple access mechanisms such as those just described and applications for accessing IoT sensor data, a 5G network may leverage virtualization and network slicing [1].

In the communications network 100 of FIG. 5, a set of services are virtualized and are spawned as a network slice, that is, the first network slice instance or Provider Slice, on demand, as described in the 3GPP standard in [1]. The terminology used refers to that used in the cited references. In the example of FIG. 5, there is a Mobile Broadband (MBB) Network slice instance 513, and a Machine-Type Communication (MTC) 514.

Monitoring Events using 3GPP Standard

An event may be understood as a change in the underlying environment that may warrant attention, e.g., location of the UE, change in location of the UE, loss of connectivity, etc. . . . . The Monitoring Events feature may be understood as being intended for monitoring of specific events, in certain 3GPP VNF nodes in the Provider slice, and making information originating from such monitoring events available to the Provider slice. A VNF may be understood as a software module or unit that may provide some networking functionality.

As described in the 3GPP standard in [1], configuration and reporting of the following monitoring events may be supported: monitoring the association of the UE and Universal Integrated Circuit Card (UICC) and/or new International Mobile Subscriber Identity (IMSI)—International Mobile Equipment Identity Software Version (IMEI-SV9 association, UE reachability, Location of the UE, and change in location of the UE, Loss of connectivity, Communication failure, number of UEs present in a geographical area and availability after Downlink Data Notification (DDN) failure as described Architecture enhancements section of [2].

As described in the 3GPP Monitoring Enhancements [3], some interfaces, e.g., Sh, Rx, may be enhanced for collecting monitoring events and information from a Home Subscriber Server (HSS) 515, and a Policy and Charging Rules Function (PCRF) 516, respectively.

Monitoring Events via the HSS 515 and the Serving General Packet Radio Service support node (SGSN)/Mobility Management Entity (MME) 517 may enable the Service Capability Exposure Function (SCEF) to configure a given Monitor Event at the HSS 515 or the SGSN/MME 517, and the Monitoring Event or Information may be made available via the SCEF to an Event Collection Entity.

Monitoring Events via the PCRF may also enable the SCEF to request the location information of a group of UEs, e.g., via an Nt interface. UE location information may be provided by a trusted or Untrusted WLAN.

Monitoring Event UE location information may be received from the SCEF via the MME/SGSN 517, HSS 515, PCRF 516, and Gateway Mobile Location Center (GMLC). Within each network slice 513, 514, a Serving Gateway (S-GW) 518 may route/forward user packet data and may act as a local mobility anchor for the user plane during handover providing charging functionality A Packet Data Network Gateway (P-GW) 519 may provide Internet Protocol (IP) connectivity towards external Packet Data Networks (PDNs), policy and admission control, packet filtering, and charging. A Software Defined Network (SDN) Controller (SDN-C) 520 may be understood to be designed to automate and control network connectivity within data centers, as well as to provide overlay network connectivity for virtual or physical network functions within a data center.

The SCEF and Event Collection Entity may be part of a network slice subnet instance, e.g., the first network slice subnet instance, which may also be referred to herein as a Consumer slice.

In the non-limiting example of FIG. 5, the service layer 525 provides mobile network services, reusable services like analytics and applications. The software network function layer 526 comprises virtualized network functions (VNFs) that may be understood as software implementations of network functions that may be deployed on a virtualization infrastructure. The infrastructure 527 may be understood to provide the resources to instantiate network functions in real time at any desired location within the operator's cloud platform, to optimize resource usage and realize optimal operational efficiency.

In the non-limiting example of FIG. 5, a Service Chaining Function 521 enables implementation of delivery of Monitoring Events to applications. If required, the SCEF may leverage the Service Chaining function 521 to deliver events to any application 522 that may consume the Monitoring Events. As a non-limiting illustrative example in FIG. 5, two such applications are depicted—Analytics 523 and Fault Management 524. The Service Chaining Function 521 may deliver Monitoring Events to the Analytics application 523 followed by Fault Management 524, vice versa, or just to the individual applications 522. This configurable delivery of Monitoring Events helps enhance the mechanisms of the SCEF and Event Collection Entity delivery in a software defined environment outside the 5G network.

Figure 6:
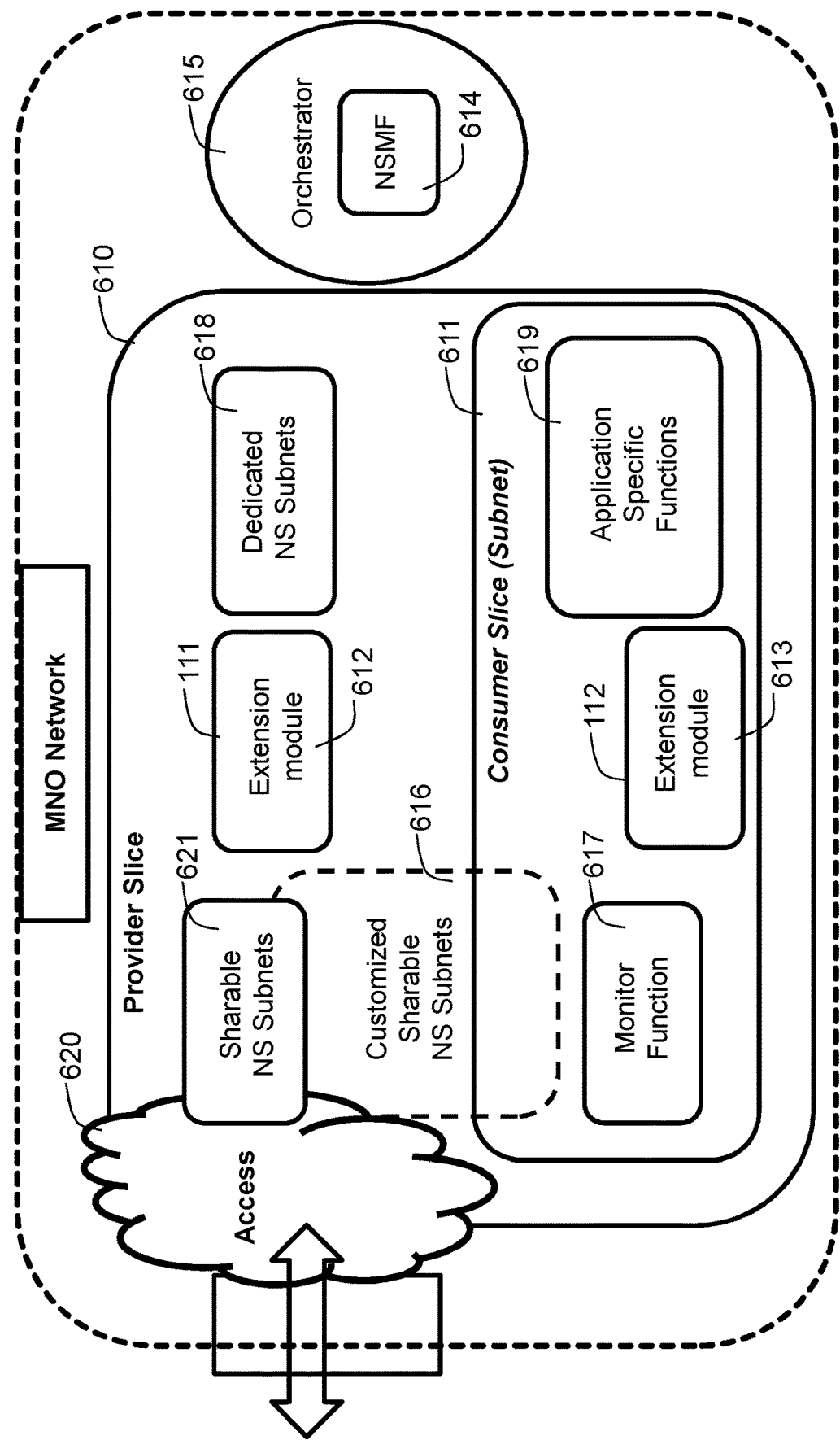
FIG. 6 is a schematic diagram illustrating an example of a first node and a second node, according to embodiments herein.

FIG. 6 is a schematic diagram depicting some aspects of embodiments herein, in the context of the example communications network 100 depicted in FIG. 5. FIG. 6 depicts the network slice instance 610, that is, the provider slice, and the first network slice subnet instance 611, that is, the consumer slice, associated with the network slice instance 610. The first node 111 and the second node 112 may perform at least some of their respective actions via a respective extension module 612, and 613, of a so-called Network Slice Management Function (NSMF). The actual NSMF is depicted in the Figure as element 614. The respective extension modules of NSMF 612 and 613 in the provider and consumer slices, respectively, may exchange the request and response through an orchestrator 615. The orchestrator 615 may be understood as a software program that may create and manage the monitoring workflow that may comprises the core monitoring function as well as any additional monitoring functions as defined in the network slices. The extension module of the NSMF 612 in the provider slice 610 may, according to Action 303 create the second network slice subnet instance 616, that is, an appropriate sharable subnet as per the request from the second node 112, via e.g., a monitor function 617 of the consumer slice 611. The second network slice subnet instance 616 is represented in FIG. 6 as a "customized sharable Network Slice (NS) subnets". As depicted in FIG. 6, the provider slice 610 may comprise a set of dedicated NS subnets 618, which may extract the data from the sensors that may be needed by the consumer slice 611. The consumer slice 611 may comprise a set of application specific functions 619 which may process the collected data and generate conclusions and insights that may help the user understand the state of the underlying IoT network. The consumer slice 611 is created within the provider slice 610. The first node 111 may perform one or more of its actions via e.g., the extension module of the NSMF 612 in the provider slice 610, the orchestrator 615, or both. The second node 112 may perform one or more of its actions via e.g., the extension module of the NSMF 613 in the "first network slice subnet instance" 611, that is, the consumer slice 611, the orchestrator 615, or both. An access element 620 is also depicted in FIG. 6. The access element 620 may be understood as a radio access network through which the provider slice 610 may be accessed and populated by the IoT device data. The sharable network slice subnets 621 may be understood as instances of one or more network slices that may be shared across, e.g., larger, network slices.

Provider Slice

The first node 111, through its extension to the NSMF 612 may, according to Action 301, intercept the requirements of a consumer slice 611 created as a subnet within it. As part of Action 302, the first node 111, through its extension to the NSMF 612 may perform a number of actions. First, it may collect the input one or more requirements of the request obtained from the second node 112, via e.g., the consumer slice 611, and may identify the sharable subnet slices 621 with microservices that may be shared between itself and the consumer slice 611. Second, it may check the authorization to filter the list of microservices that a user or the second node 112 may be authorized to request. Third, for the authorized microservices, it may check the scale up requirements and perform the appropriate scaling up. Fourth, it may then create, according to Action 303, the second network slice subnet instance 616, that is a sharable subnet slice comprising the smaller subnet slices, e.g., the sharable subnet slices 621, taking into account the KPI requirements of the request. Fifth, according to Action 305, the created second network slice subnet instance 616 may then be added to the first network slice subnet instance 611, that is, the consumer slice. Sixth, when the second node 112, e.g., via the orchestrator 615 may, according to Action 405, inform about the change, that is termination, of the first network slice subnet instance 611, the first node 111 via its NSMF extension module 612, may reconfigure, that is, tear down, the second network slice subnet instance 616.

Consumer Slice

The first network slice subnet instance 611, or consumer subnet slice or simply consumer slice, is in the example of FIG. 6, a subnet within the provider slice 610, and it may be triggered in some examples by the orchestrator 615. The first network slice subnet instance 611 may comprise the input microservices and other aggregator functions that may be required for monitoring the first performance, that is, the specific monitoring under consideration. The second node 112, through its respective extension module to the NSMF 613, may perform the following actions. First, it may enumerate the subnet slices, e.g., the sharable subnet slices 621, for the aggregator functions that may be necessary for monitoring the second performance. Second, it may let the orchestrator 615 know the inputs it may need from the provider slice 610. The inputs may be understood to be provided by the microservices that fulfil the network slice functionality. Third, when, according to Action 402, it may get the second network slice subnet instance 616 from the first node 111, e.g., via the orchestrator 615, it may complete the construction of the full second network slice subnet instance 616 in Action 403, and activate it, according to Action 404. Fourth, the orchestrator 615 may be informed in case of a change in the input requirements/KPIs of the monitoring application, hence the second network slice subnet instance 616, and in case of the termination of the first network slice subnet instance 611. Examples of input requirements/KPIs may be a change in monitoring frequency, such as every 10 minutes instead of 20 minutes, or a change in aggregation function, such as a maximum instead of an average.

The second network slice subnet instance 616 may be implemented as a standalone service in the Service Layer as well. This may be applicable when the monitoring service may be offered as a value-added reseller service by a third-party entity, and not by the provider slice. This may be considered a logical separation. Functionally, it may be similar to a Consumer Subnet Slice. In this disclosure, the term Consumer Subnet Slice is used for sake of simplicity. This applies for service implementation as well.

Figure 7:
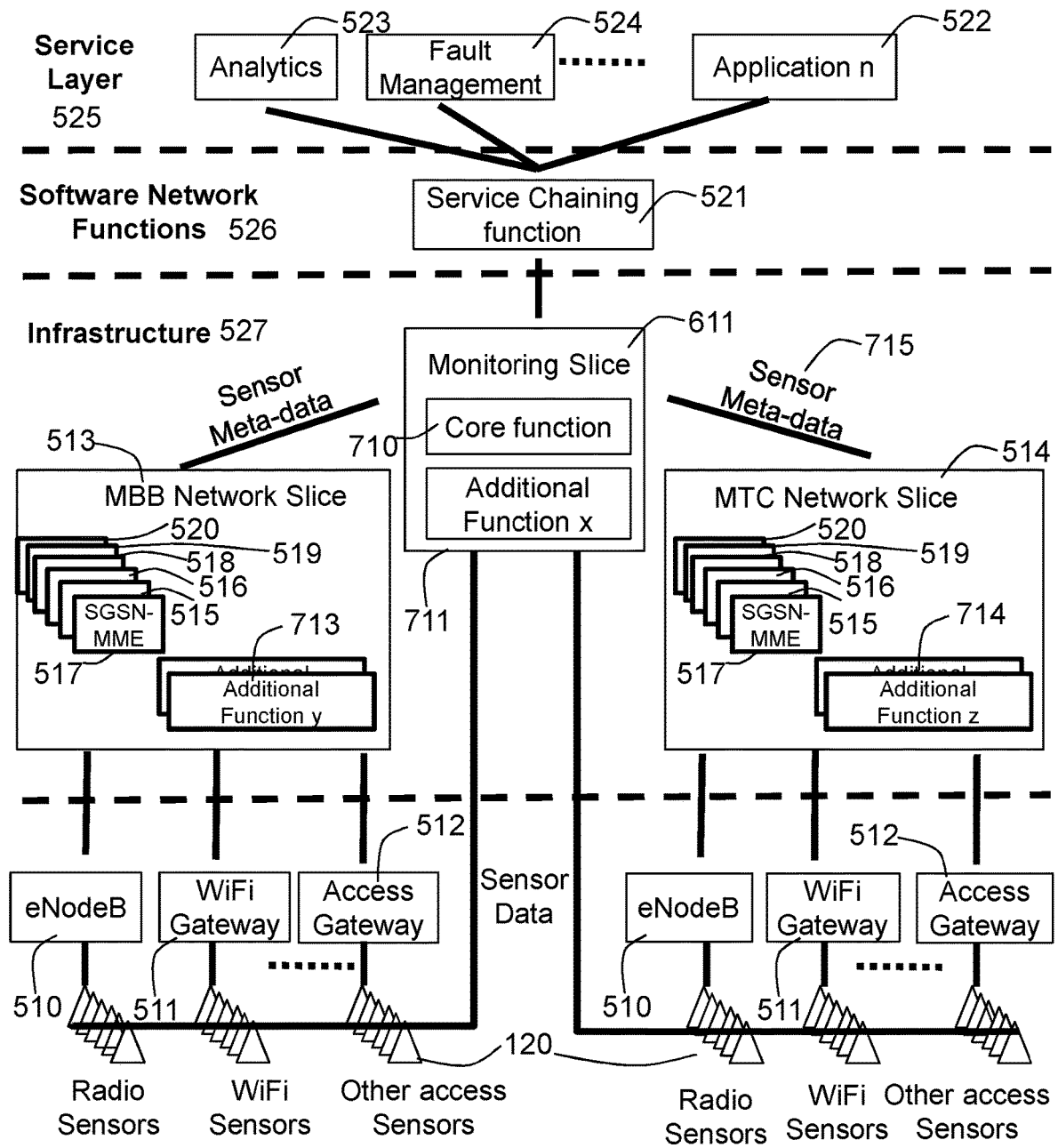
FIG. 7 is a schematic diagram illustrating an example of a communications network, according to embodiments herein.
Figure 8:
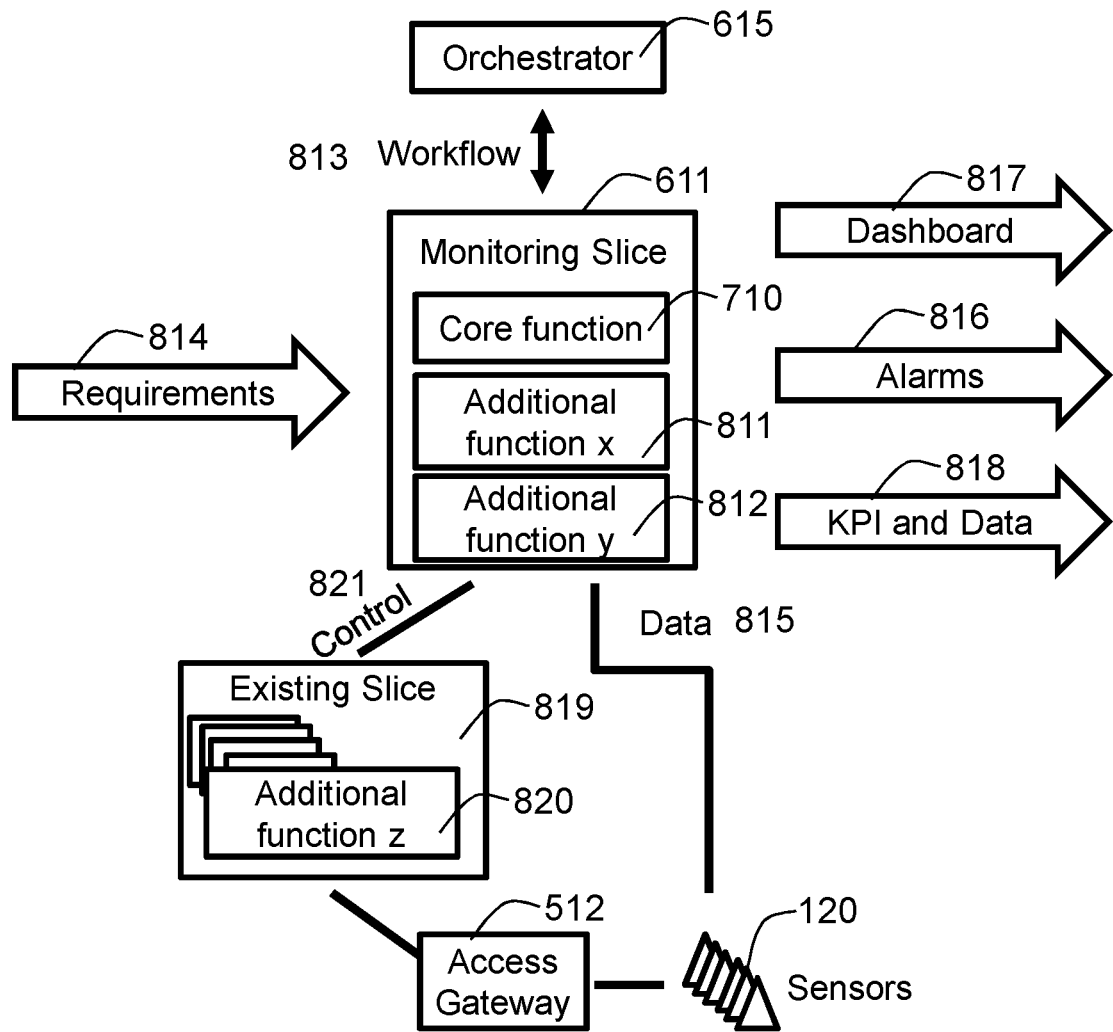
FIG. 8 is a schematic block diagram illustrating an example of a method by a first node, according to embodiments herein.

Within the context provided by FIG. 5 and FIG. 6, further details of how the second network slice subnet instance 616 of embodiments herein may be established, and perform its functions, will now be provided in reference to FIG. 7 and FIG. 8. FIG. 7 is a schematic diagram illustrating a non-limiting example of a mechanism for on-demand monitoring, according to embodiments herein. Unless otherwise noted, the description of FIG. 7 is the same as that provided for FIG. 5. The disclosed mechanism for on-demand monitoring may be treated as a special network slice subnet within the provider slice, as stated earlier, referred to as "second network slice subnet instance" 616 that may be spawned on-the-fly. The first network slice subnet instance 611, also referred to as the consumer slice, is depicted in FIG. 7 as a "Monitoring Slice". It may comprise a core monitoring function 710. There may be provisions for additional functions 711 that may be invoked by the core function 710. Some examples of these additional functions 711 may be aggregation functions, correlation functions, etc. These additional functions 711 may be virtualized and may be implemented either as a virtual machine, container or a process. Some of the additional functions may be part of the MBB network slice 513, e.g., additional function y 713, and the MTC network slice 514, e.g., additional function z 714. These additional functions may be exposed as a shareable subnet slice referred to as the second network slice subnet instance 616, according to embodiments herein. Sensor metadata 715 may be understood to include information about the sensors in the sector 120, such as their device identifier (id), network profile etc. These may also be exposed through functions constituting the second network slice subnet instance 616.

To summarize some of the foregoing in other words, embodiments herein may be understood to enable the following features.

1. The externally visible microservices of an IoT platform may be maintained in sharable subnet slices within a provider slice 610.

2. Depending upon the requests of a consumer slice 611, which may be a subnet of the provider slice 610, a new subnet slice, that is, the second network slice subnet instance 616, may be created within the provider slice 610 as a subnet which is sharable with the consumer slice 611. The second network slice subnet instance 616 may contain the microservices which may provide the data required by the consumer slice 611.

3. The microservices that consume the data may have the flexibility to be implemented using network subnet slicing or as an independent service that may sit above the network slices (in the services layer) and consume the provider data.

4. The management function of the provider slice 610 may be enhanced with a module that may be responsible for processing the requests of a consumer slice 611, computing the optimal microservice, and creating and activating the second network slice subnet instance 616. It may be also responsible for scaling up/down and tearing down the created second network slice subnet instance 616 when the first network slice subnet instance 611 is terminated.

FIG. 8 is a schematic diagram illustrating a non-limiting example of a consumer slice system according to embodiments herein, at a high level with its interfaces. Within a 5G IoT-based network, the monitoring function of the second performance may be assisted by the second network slice subnet instance 616 as follows.

The first network slice subnet instance 611 comprises the core function 710 just described, an additional function x 811 and an additional function y 812.

1. When a requirement/request arises for on-demand monitoring of the second performance, the orchestrator 615, may execute a workflow 813 which spawns the second network slice subnet instance 616, that is, a dedicated network slice, which may be a subnet of the provider slice 610, for the request.

In the non-limiting embodiment shown in FIG. 8, the second network slice subnet instance 616 is a modified existing second network slice subnet instance 819, labelled "existing slice" in FIG. 8, based on the one or more requirements of the obtained request. The existing slice 819 may have sensor data microservices and also additional functions z 820, such as aggregation functions, correlation functions, etc. A control 821 provides the protocol for creation and modification of sharable subnets.

a. This dedicated network slice, the second network slice subnet instance 616, may be modeled as per the 3GPP standard [1] as a network slice instance.

2. Once spawned, the core monitoring function, also referred to as core function 710, may be provided with the one or more requirements. That is, a set of input requirements 814 either in the form of file-injection, workflow driven during spawning phase, and/or through a Representational State Transfer (REST) Application Programming Interface (API), once it is up and running.

3. On receipt of the one or more requirements ("Requirements") 814 of the request for the second performance described in Action 301, the core function 710 may make a discovery request to the orchestrator 615 and the application server to discover its available options for monitoring.

4. In response to the request, from the core function 710, the orchestrator 615 may pass the available infrastructure elements catering to the second node 112, e.g., the NSMF extension module (e-NSMF) 612 of the network slice instance 610.

5. The e-NSMF 612 may then perform the following:
   a. Discover the available microservices catering to the requests from the core function 710 of the network slice instance 610;
   b. There may be an authorization check at this point to ensure the core monitoring function 710 is authorized for the requested function;
   c. With the complete list of available microservices, the e-NSMF 612 may correlate the core function 710 requirements against the available microservices to decide on the best set of sources to be monitored to meet the requirement;
   d. The e-NSMF 612 may establish a monitoring request to the IoT devices in the sector 120, and collect data 815 which may include diagnostic data such as location and device characteristics, such as battery, current latency, etc. . . . . If this data 815 is available in the infrastructure nodes, they may be given a higher priority.
   e. The final list of microservices may be bundled in a freshly-created subnet slice, the second network slice subnet instance 616, which may be sharable, and its handling may be returned to the orchestrator 615, which in turn may return it to the core function 710 in the consumer slice 611.

6. The core function 710 may call the NSMF 613 of the first network slice subnet instance 611 to include the sharable second network slice subnet instance 616 from the provider in the consumer slice 611.

7. In order to meet the monitoring requirement, there may be a need to invoke/create additional functions like aggregation, sum, etc. in the second network slice subnet instance 616:
   a. While invoking the additional functions 811, 812, the core function 710 may prioritize their location to ensure key KPI's are met. These KPI's may include but are not limited to low latency, less network bandwidth requirement, etc.
   a. These KPI's may be included in the initial requirement provided to the monitoring application.
   b. The core function 710 may invoke the orchestrator 615 to spawn any new additional function/slices in the network and request its location based on the above KPI conditions.
   c. The core function 710 may then proceed to collect the relevant data 815 from both the infrastructure and IoT devices in the sector 120 to continuously monitor the required KPI's.

8. The core function 710 may continuously evaluate the data flow and automatically make relevant adjustments.
   a. This may include turning off some data feeds and turning on new data feeds.
   b. This may include dynamically scaling-up/down its own functions or put in request to scale up/down the additional functions from the provider slice 610.

9. The second network slice subnet instance 616 may support the following types of outputs:
   a. Alarms 816 when requested KPIs are not met (sent to OSS systems);
   b. Dashboard service 817 presenting real-time data;
   c. Requested KPIs and supporting data 818 published through REST API for northbound consumption.

10. New KPI's may optionally be injected into the core function through REST API, by application or administrator, and the core function 710 may re-evaluate and adjust or meet the new KPI's.

11. Once the requirement for the monitoring ceases to exist, the core function 710 may be terminated gracefully:
   a. all ongoing data feeds and connections,
   b. any existing additional functions invoked,
   c. terminate, through the orchestrator 615, any additional function that the core function 710 requested for the said requirement,
   d. This is transmitted to the first node 111, e.g., the e-NSMF 612 in the provider slice 610, which may then tear down the corresponding second network slice subnet instance 616.

Embodiments herein may be deployed on distributed cloud servers. Thus, a user's dashboard may be deployed on a centralized cloud server, and the monitoring functions may be deployed in various parts of the 5G IoT-based communications network in edge servers. The exact topology of this deployment may be specified by the user based on considerations of latency minimization, as shown in FIGS. 5 and 7 above.

Particular non-limiting examples of embodiments herein will now be described based on the Building Automation System introduced in FIG. 1. The following examples will illustrate how the second network slice subnet instance of embodiments herein may be used for dynamic on-demand IoT system monitoring, thereby addressing the challenges that were raised earlier in regards to existing methods.

Example 1

Figure 9:
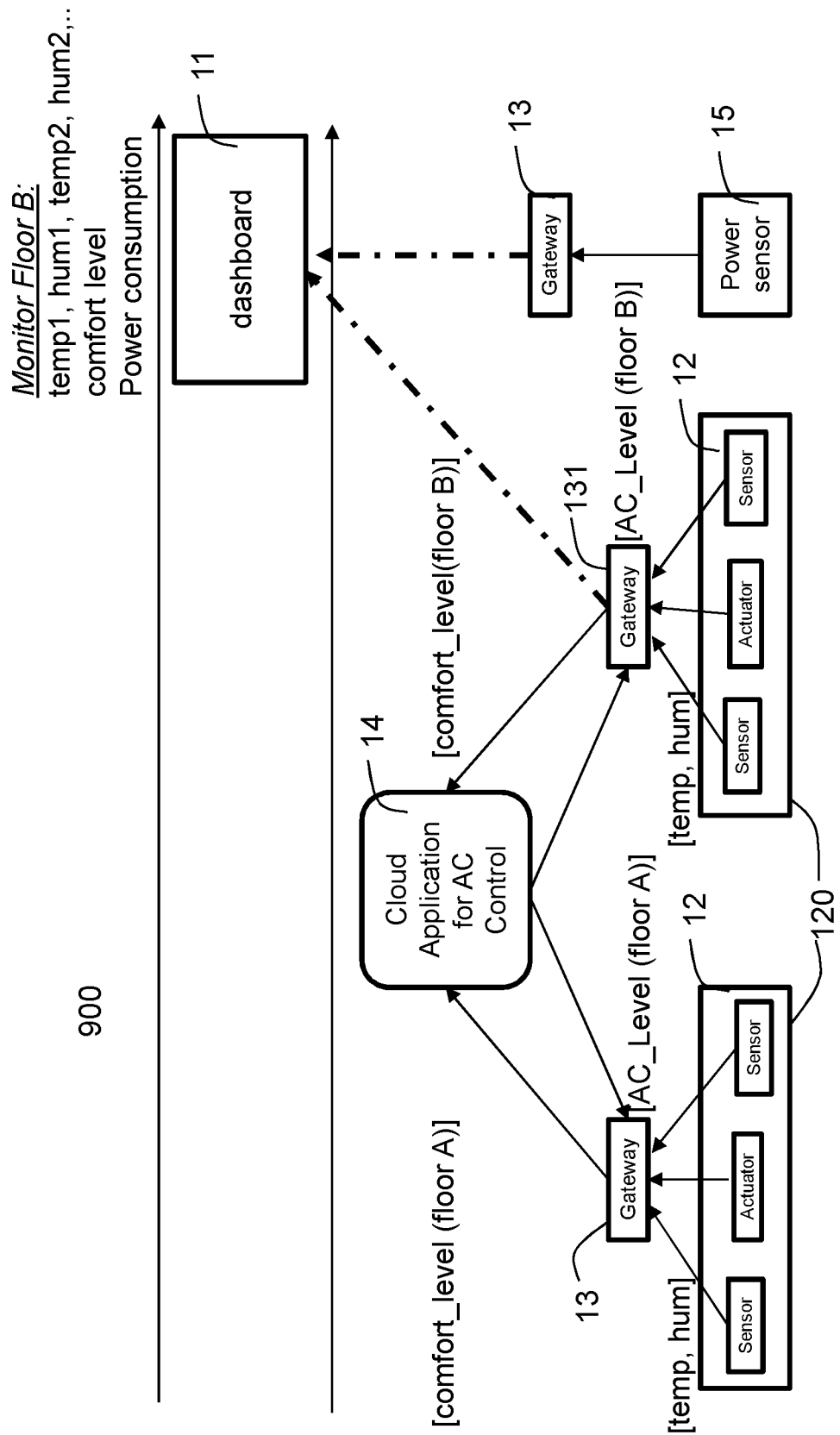
FIG. 9 is a schematic diagram illustrating another example of a communications network, according to embodiments herein.

FIG. 9 is a schematic diagram depicting the first network slice subnet instance or consumer slice for BCM 900 when only Floor B is monitored. The second node 112, via the consumer slice, requests data access from Floor B gateway and the power manager gateway 131, and a dashboard functionality 11. The first node 111, here a BAS e-NSMF, provides the second network slice subnet instance, a sharable subnet slice, with microservices running on the Floor B gateway 131 to the BCM 900.

Example 2

Figure 10:
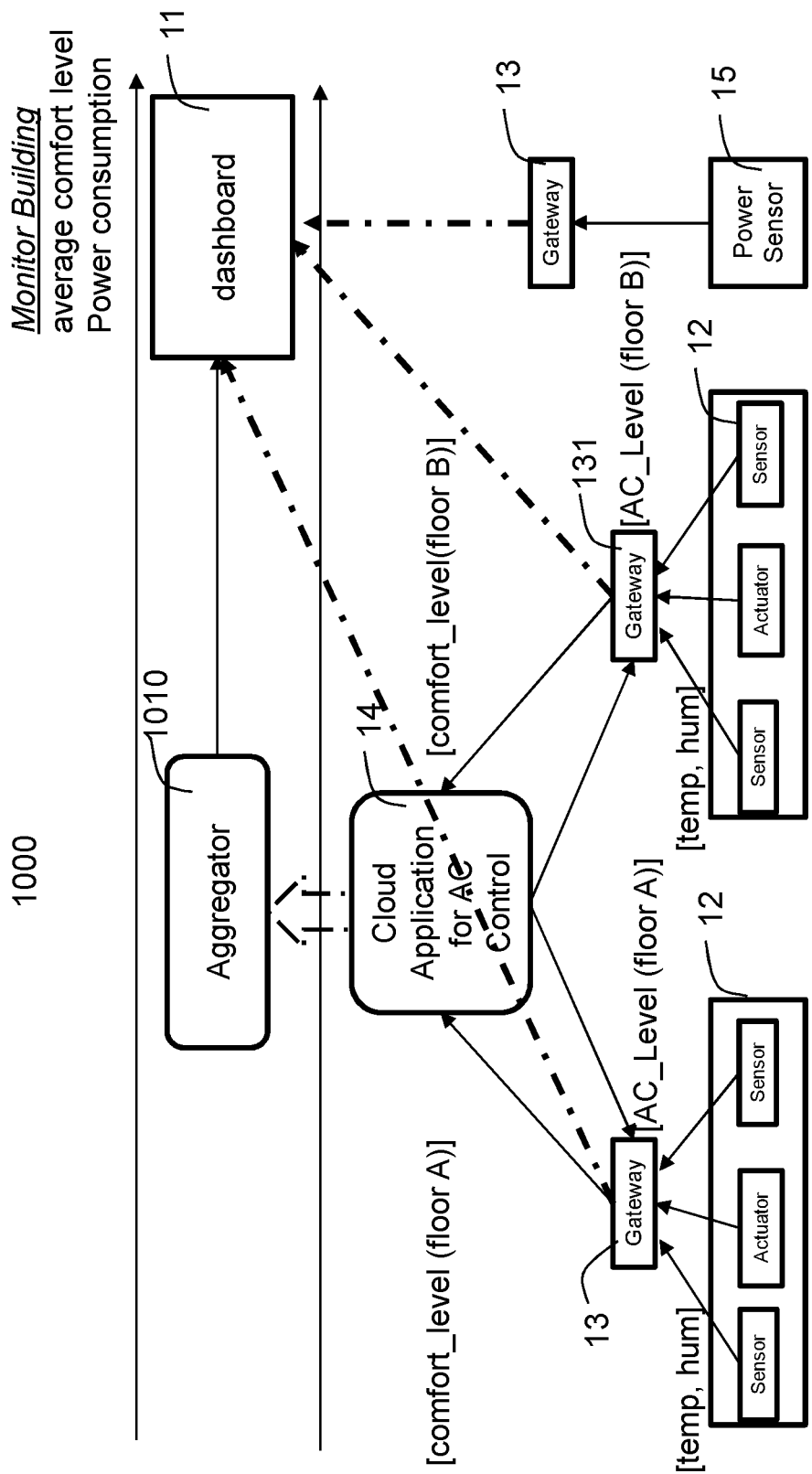
FIG. 10 is a schematic diagram illustrating yet another example of a communications network, according to embodiments herein.

FIG. 10 shows first network slice subnet instance or consumer slice of the BCM 1000 when only building level data such as average comfort levels, all AC settings and power consumption are being monitored. Note that in this case, the AC settings are being collected from the gateways 13, 131, and not from the output of the cloud application 14 which may also provide the AC settings. Hence, the subnet slice provided by the first node 111, here also the BAS e-NSMF, includes only the aggregator microservice 1010.

Example 3

In a third example, a temperature sensor may be considered which is using the 5G IoT-based network to report temperature in a room in a building. A monitoring system according to embodiments herein may be used to detect a fault in the sensor, utilizing the second network slice subnet instance, as follows. The sensor has stopped sending the temperature data. This is detected by the monitoring application at the corresponding microservice end-point included in the current subnet slice, the first network slice subnet instance. The first network slice subnet instance triggers reconfiguration through the e-NSMF in the second node 112, by requesting for microservices providing predictive analytics based on historical temperature data. An existing second network slice subnet instance from the Provider Slice is reconfigured to include the new microservice.

As a simplified overview of the foregoing, embodiments herein may be understood to relate to an automatically and dynamically generable consumer slice that may help monitoring a Provider Slice to which it belongs, each provider slice comprising functionality that runs an IoT sensor network on top of a 5G environment. A first node 111 via an extension to an NSMF may create, configure and terminate subnet slices based on dynamic changes in the requirements of the Consumer slices and reconfiguration of Provider slices. Embodiments herein may also relate to creating, reconfiguring, and/or terminating consumer slices requiring sharable microservices from provider slices providing IoT platform services. The subnet slice creation may be flexibly adjusted based on the needs of the user, and may also involve the identification of microservices to obtain monitoring data in the most efficient manner possible. Particular embodiments herein may relate to a system and method for on-demand user-specific monitoring in large-scale virtualized sensor networks.

One advantage of embodiments herein is that, 5G network slicing technology is automatically and dynamically leveraged to provide a dynamic reconfiguration and allocation feature for monitoring applications. A further advantage of embodiments herein is that they minimize end-to-end latency for monitoring. Yet another advantage of embodiments herein is that they optimize bandwidth and computation resources in the IoT platform implementation.

Figure 11:
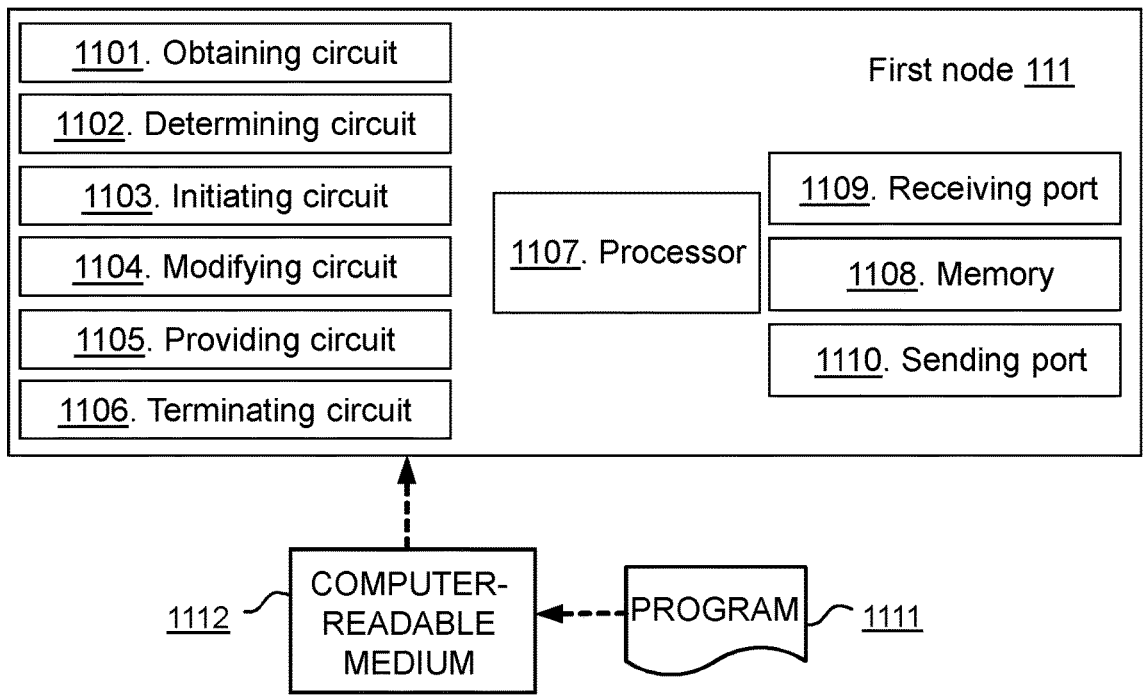
FIG. 11 is a schematic block diagram illustrating two non-limiting examples, a) and b), of a first node, according to embodiments herein.
Figure 11:
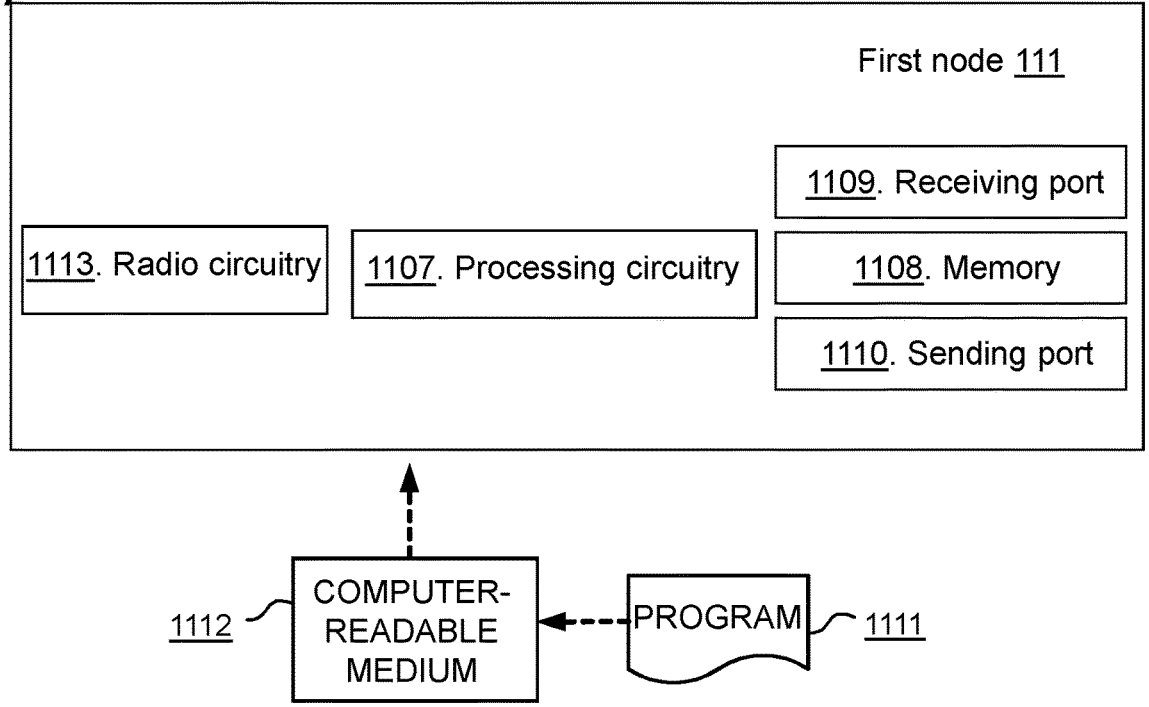

To perform the method actions described above in relation to FIG. 3, the first node 111 may comprise the following arrangement depicted in FIG. 11. The first node 111 is configured to manage the network slice instance in the communications network 100. The first performance of the network slice instance is configured to be monitored by the first network slice subnet instance configured to be associated with the network slice instance. The first node 111 is configured to be comprised in the communications network 100.

The detailed description of some of the following corresponds to the same references provided above, in relation to the actions described for the first node 111, and will thus not be repeated here. For example, the sector 120 of the communications network 100 may be configured to comprise IoT sensors.

The first node 111 is configured to, e.g. by means of an obtaining circuit 1101 within the first node 111 configured to, obtain, from the second node 112 configured to be comprised in the communications network 100, the request to monitor the second performance of the network slice instance. The second performance is configured to be of the one or more microservices to provide data on the sector 120 of the communications network 100. The obtaining circuit 1101 may be a processor 1107 of the first node 111, or an application running on such processor.

The first node 111 is also configured to, e.g. by means of a determining circuit 1102 within the first node 111 configured to, determine, based on one or more requirements of the request configured to be obtained, to perform one of:
  i. initiate the creation of the second network slice subnet instance adapted to monitor the second performance based on the one or more requirements, the second network slice subnet instance being: a) independent from the first network slice subnet instance, and b) sharable with the first subnet slice instance, and
  ii. modify, based on the one or more requirements, the existing second network slice subnet instance, to monitor the second performance, the existing second network slice subnet instance being: a) independent from the first network slice subnet instance, and b) sharable with the first subnet slice instance. The determining circuit 1102 may be the processor 1107 of the first node 111, or an application running on such processor.

In some embodiments, the first node 111 may be configured to, e.g. by means of an initiating circuit 1103 within the first node 111 configured to, initiate the creation of the second network slice subnet instance based on the one or more requirements of the request configured to be obtained. The initiating circuit 1103 may be the processor 1107 of the first node 111, or an application running on such processor.

In some embodiments, the first node 111 may be configured to, e.g. by means of a modifying circuit 1104 within the first node 111 configured to, modify the existing second network slice subnet instance based on the one or more requirements of the request configured to be obtained. The modifying circuit 1104 may be the processor 1107 of the first node 111, or an application running on such processor.

In some embodiments, the first node 111 may be configured to, e.g. by means of an providing circuit 1105 within the first node 111 configured to, provide, to the second node 112, one of: a) the second network slice subnet instance configured to be initiated, and b) the existing second network slice subnet instance configured to be modified. The providing circuit 1105 may be the processor 1107 of the first node 111, or an application running on such processor.

In some embodiments, the first node 111 may be configured to, e.g. by means of the obtaining circuit 1101 within the first node 111 configured to, obtain the indication from the second node 112 configured to indicate that monitoring of the second performance has been completed.

In some embodiments, the first node 111 may be configured to, e.g. by means of a terminating circuit 1106 within the first node 111 configured to, terminate, based on the indication configured to be obtained, one of: a) the second network slice subnet instance configured to be created, and b) the existing second network slice subnet instance configured to be modified. The terminating circuit 1106 may be the processor 1107 of the first node 111, or an application running on such processor.

The embodiments herein may be implemented through one or more processors, such as a processor 1107 in the first node 111 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1108 comprising one or more memory units. The memory 1108 is arranged to be used to store obtained information, store data, configurations, schedulings, and applications etc. to perform the methods herein when being executed in the first node 111.

In some embodiments, the first node 111 may receive information from, e.g., the second node 112, through a receiving port 1109. In some examples, the receiving port 1109 may be, for example, connected to one or more antennas in first node 111. In other embodiments, the first node 111 may receive information from another structure in the communications network 100 through the receiving port 1109. Since the receiving port 1109 may be in communication with the processor 1107, the receiving port 1109 may then send the received information to the processor 1107. The receiving port 1109 may also be configured to receive other information.

The processor 1107 in the first node 111 may be further configured to transmit or send information to e.g., the second node 112, through a sending port 1110, which may be in communication with the processor 1107, and the memory 1108.

Those skilled in the art will also appreciate that the obtaining circuit 1101, the determining circuit 1102, the initiating circuit 1103, the modifying circuit 1104, the providing circuit 1105, and the terminating circuit 1106 described above may refer to a combination of analog and digital circuits, and/or one or more processors configured with software and/or firmware, e.g., stored in memory, that, when executed by the one or more processors such as the processor 1107, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 1111 product, comprising instructions, i.e., software code portions, which, when executed on at least one processor 1107, cause the at least one processor 1107 to carry out the actions described herein, as performed by the first node 111. The computer program 1111 product may be stored on a computer-readable storage medium 1112. The computer-readable storage medium 1112, having stored thereon the computer program 1111, may comprise instructions which, when executed on at least one processor 1107, cause the at least one processor 1107 to carry out the actions described herein, as performed by the first node 111. In some embodiments, the computer-readable storage medium 1112 may be a non-transitory computer-readable storage medium, such as a CD ROM disc, a memory stick, or stored in the cloud space. In other embodiments, the computer program 1111 product may be stored on a carrier containing the computer program, wherein the carrier is one of an electronic signal, optical signal, radio signal, or the computer-readable storage medium 1112, as described above.

The first node 111 may comprise an interface unit to facilitate communications between the first node 111 and other nodes or devices, e.g., the second node 112. In some particular examples, the interface may, for example, include a transceiver configured to transmit and receive radio signals over an air interface in accordance with a suitable standard.

Figure 12:
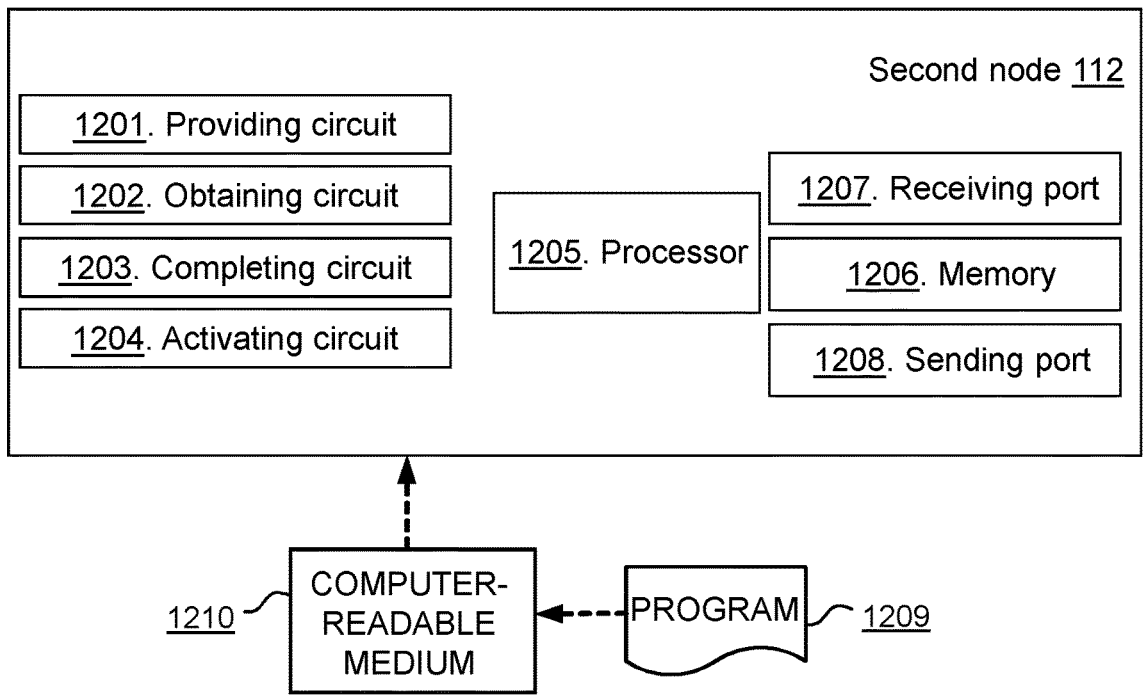
FIG. 12 is a schematic block diagram illustrating two non-limiting examples, a) and b), of a second node, according to embodiments herein.
Figure 12:
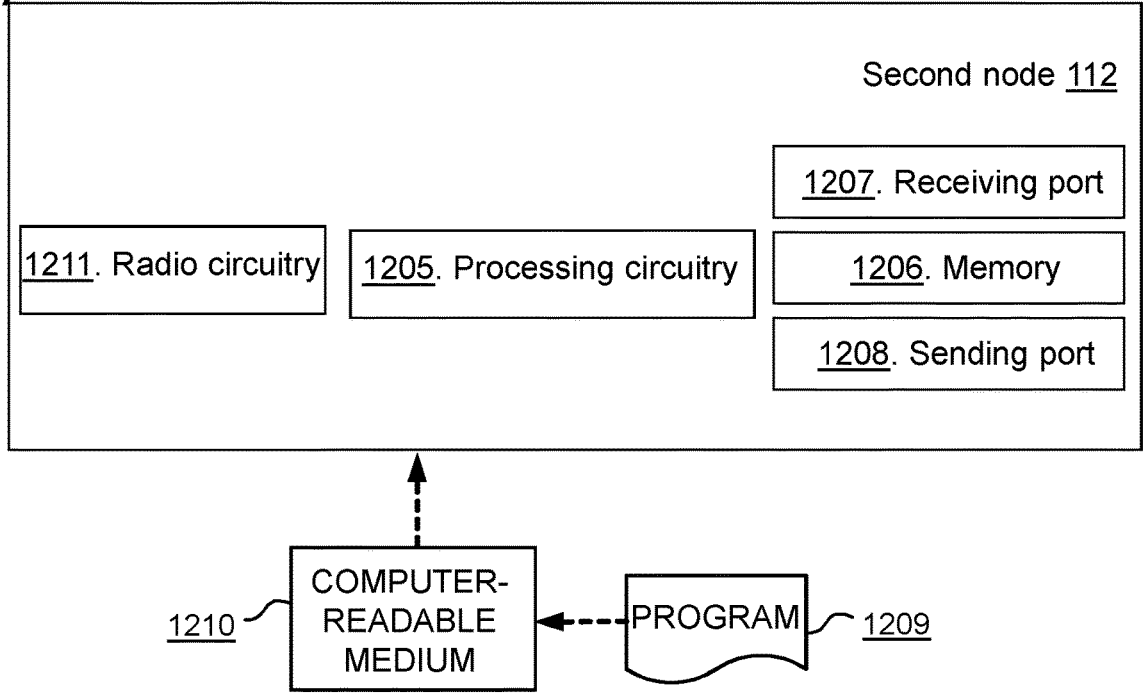

To perform the method actions described above in relation to FIG. 4, the second node 112 may comprise the following arrangement depicted in FIG. 12. The second node 112 is configured to manage the network slice instance in the communications network 100. The first performance of the network slice instance is configured to be monitored by the first network slice subnet instance configured to be associated with the network slice instance. The first network slice subnet instance is configured to be managed by the second node 112. The second node 112 is configured to be comprised in the communications network 100.

The detailed description of some of the following corresponds to the same references provided above, in relation to the actions described for the second node 112, and will thus not be repeated here. For example, the sector 120 of the communications network 100 may be configured to comprise IoT sensors.

The second node 112 is configured to, e.g. by means of a providing circuit 1201 within the second node 112 configured to, provide, to the first node 111 configured to be comprised in the communications network 100, the request to monitor the second performance of the network slice instance. The second performance is of one or more microservices to provide data on the sector 120 of the communications network 100. The providing circuit 1201 may be a processor 1205 of the second node 112, or an application running on such processor.

The second node 112 is also configured to, e.g. by means of an obtaining circuit 1202 within the second node 112 configured to, obtain, from the first node 111, based on one or more requirements of the request configured to be provided, one of:

i. the initiated second network slice subnet instance adapted to monitor the second performance based on the one or more requirements, the second network slice subnet instance being configured to be: a) independent from the first network slice subnet instance, and b) sharable with the first subnet slice instance, and ii. the existing second network slice subnet instance, modified, based on the one or more requirements, to monitor the second performance, the modified second network slice subnet instance being configured to be: a) independent from the first network slice subnet instance, and b) sharable with the first subnet slice instance. The obtaining sending circuit 1202 may be the processor 1205 of the second node 112, or an application running on such processor.

In some embodiments, the second node 112 may be configured to, e.g. by means of a completing circuit 1203 within the second node 112 configured to, complete construction, based on the one or more requirements of the request configured to be provided, one of: a) the initiated second network slice subnet instance and b) the modified second network slice subnet instance. The completing circuit 1203 may be a processor 1205 of the second node 112, or an application running on such processor.

In some embodiments, the second node 112 may be configured to, e.g. by means of an activating circuit 1204 within the second node 112 configured to, activate, based on the one or more requirements of the request configured to be provided, the one of: a) the initiated second network slice subnet instance configured to be completed and b) the modified second network slice subnet instance configured to be completed. The activating circuit 1204 may be a processor 1205 of the second node 112, or an application running on such processor.

In some embodiments, the second node 112 may be configured to, e.g. by means of the providing circuit 1201 within the second node 112 configured to, provide, based on the data configured to be provided by the configured to be activated one of: a) the initiated second network slice subnet instance configured to be completed and b) the modified second network slice subnet instance, the indication to the first node 111 configured to be completed, the indication being configured to indicate that monitoring of the second performance has been completed. The activating circuit 1204 may be a processor 1205 of the second node 112, or an application running on such processor.

The embodiments herein may be implemented through one or more processors, such as a processor 1205 in the second node 112 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1206 comprising one or more memory units. The memory 1206 is arranged to be used to store obtained information, store data, configurations, schedulings, and applications etc. to perform the methods herein when being executed in the second node 112.

In some embodiments, the second node 112 may receive information from, e.g., the first node 111, through a receiving port 1207. In some examples, the receiving port 1207 may be, for example, connected to one or more antennas in second node 112. In other embodiments, the second node 112 may receive information from another structure in the communications network 100 through the receiving port 1207. Since the receiving port 1207 may be in communication with the processor 1205, the receiving port 1207 may then send the received information to the processor 1205. The receiving port 1207 may also be configured to receive other information.

The processor 1205 in the second node 112 may be further configured to transmit or send information to e.g., the first node 111 or any of the one or more wireless devices 140, through a sending port 1208, which may be in communication with the processor 1205, and the memory 1206.

Those skilled in the art will also appreciate that the providing circuit 1201, the obtaining circuit 1202, the completing circuit 1203, and the activating circuit 1204 described above may refer to a combination of analog and digital circuits, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the second node 112 may be respectively implemented by means of a computer program 1209 product, comprising instructions, i.e., software code portions, which, when executed on at least one processor 1205, cause the at least one processor 1205 to carry out the actions described herein, as performed by the second node 112. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the second node 112. In some embodiments, the computer-readable storage medium 1210 may be a non-transitory computer-readable storage medium, such as a CD ROM disc, a memory stick, or stored in the cloud space. In other embodiments, the computer program 1209 product may be stored on a carrier containing the computer program, wherein the carrier is one of an electronic signal, optical signal, radio signal, or the computer-readable storage medium 1210, as described above.

The second node 112 may comprise an interface unit to facilitate communications between the second node 112 and other nodes or devices, e.g., the first node 111. In some particular examples, the interface may, for example, include a transceiver configured to transmit and receive radio signals over an air interface in accordance with a suitable standard.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES

[1] "Study on management and orchestration of network slicing for next generation network", accessible from https://portal.3gpp.org/desktopmodules/Specifications/SpecificationDetails.aspx?specificationId=3091

[2] "Architecture enhancements to facilitate communications with packet data networks and applications" Release 15: https://portal.3gpp.org/desktopmodules/Specifications/SpecificationDetails.aspx?specificationId=862

[3] "Monitoring Enhancements" Release 13: https://portal.3gpp.org/desktopmodules/Specifications/SpecificationDetails.aspx?specificationId=878

The invention claimed is:

1. A method, performed by a first node, for managing a network slice instance in a communications network, a first performance of the network slice instance being monitored by a first network slice subnet instance associated with the network slice instance, the first node comprised in the communications network, the method comprising:
    obtaining from a second node comprised in the communications network, a request to monitor a second performance of the network slice instance, the second performance being of one or more microservices to provide data on a sector of the communications network, and
    determining, based on one or more requirements of the obtained request, wherein the one or more requirements comprise requirements associated with the one or more microservices required to monitor the second performance, to perform one of:
        i. initiating a creation of a second network slice subnet instance adapted to monitor the second performance using one or more monitoring functions based on the one or more requirements of the obtained request, wherein the second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance; and
        ii. modifying, an existing second network slice subnet instance to use the one or more monitoring functions based on the one or more requirements, to monitor the second performance, wherein the existing second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance.

2. The method according to claim 1, further comprising:
    providing, to the second node, one of: a) the created second network slice subnet instance, and b) the modified existing second network slice subnet instance.

3. The method according to claim 2, further comprising:
    obtaining an indication from the second node indicating that monitoring of the second performance has been completed, and
    terminating, based on the obtained indication, one of: a) the created second network slice subnet instance, and b) the modified existing second network slice subnet instance.

4. The method according to claim 1, wherein the sector of the communications network comprises Internet-of-Things sensors.

5. A method, performed by a second node, for managing a network slice instance in a communications network, a first performance of the network slice instance being monitored by a first network slice subnet instance associated with the network slice instance, the first network slice subnet instance being managed by the second node, the second node comprised in the communications network, the method comprising:
    providing to a first node comprised in the communications network, a request to monitor a second performance of the network slice instance, the second performance being of one or more microservices to provide data on a sector of the communications network, and
    obtaining, from the first node, based on one or more requirements of the provided request, wherein the one or more requirements comprises requirements associated with the one or more microservices required to monitor the second performance, one of:
        i. a created second network slice subnet instance adapted to monitor the second performance using one or more monitoring functions based on the one or more requirements of the obtained request, wherein the second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance; and
        ii. an existing second network slice subnet instance, modified to use the one or more monitoring functions based on the one or more requirements, to monitor the second performance, wherein the modified second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance.

6. The method according to claim 5, further comprising:
    completing construction, based on the one or more requirements of the provided request, one of: a) the created second network slice subnet instance and b) the modified second network slice subnet instance, and
    activating, based on the one or more requirements of the provided request, the one of: a) the completed created second network slice subnet instance and b) the completed modified second network slice subnet instance.

7. The method according to claim 6, further comprising:
    providing, based on the data provided by the activated one of: a) the completed created second network slice subnet instance and b) the completed modified second network slice subnet instance, an indication to the first node, the indication indicating that monitoring of the second performance has been completed.

8. The method according to claim 5, wherein the sector of the communications network comprises Internet-of-Things sensors.

9. A first node comprising a processor circuit configured to manage a network slice instance in a communications network, a first performance of the network slice instance monitored by a first network slice subnet instance associated with the network slice instance, the first node comprised in the communications network, the first node being further configured to:
    obtain from a second node comprised in the communications network, a request to monitor a second performance of the network slice instance, the second performance being of one or more microservices to provide data on a sector of the communications network, and determine, based on one or more requirements of the request obtained, wherein the one or more requirements comprise requirements associated with the one or more microservices required to monitor the second performance, to perform one of to:
  i. initiate a creation of a second network slice subnet instance adapted to monitor the second performance using one or more monitoring functions based on the one or more requirements of the obtained request, wherein the second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance; and
  ii. modify, an existing second network slice subnet instance to use the one or more monitoring functions based on the one or more requirements, to monitor the second performance, wherein the existing second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance.

10. The first node according to claim 9, further configured to:
provide, to the second node, one of: a) the created second network slice subnet instance, and b) the modified existing second network slice subnet instance.

11. The first node according to claim 10, further comprising:
obtain an indication from the second node indicating that monitoring of the second performance has been completed, and
terminate, based on the indication configured to be obtained, one of: a) the created second network slice subnet instance, and b) the modified existing second network slice subnet instance.

12. The first node according to claim 9, wherein the sector of the communications network comprises Internet-of-Things sensors.

13. A second node comprising a processor circuit configured to manage a network slice instance in a communications network, a first performance of the network slice instance being monitored by a first network slice subnet instance associated with the network slice instance, the first network slice subnet instance managed by the second node, the second node comprised in the communications network, the second node further configured to:

provide, to a first node comprised in the communications network, a request to monitor a second performance of the network slice instance, the second performance being of one or more microservices to provide data on a sector of the communications network, and obtain, from the first node, based on one or more requirements of the request wherein the one or more requirements comprises requirements associated with the one or more microservices required to monitor the second performance, one of:
  i. a created second network slice subnet instance adapted to monitor the second performance using one or more monitoring functions based on the one or more requirements of the obtained request, wherein the second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance; and
  ii. an existing second network slice subnet instance, modified to use the one or more monitoring functions based on the one or more requirements, to monitor the second performance, wherein the modified second network slice subnet instance: a) is independent from the first network slice subnet instance, such that the second network slice subnet instance and the first network slice subnet instance are separate network slice subnet instances within the network slice instance, and b) has sharable network resources with the first network slice subnet instance.

14. The second node according to claim 13, further configured to:
complete construction, based on the one or more requirements of the provided request, one of: a) the created second network slice subnet instance and b) the modified second network slice subnet instance, and
activate, based on the one or more requirements of the provided request, one of: a) the completed created second network slice subnet instance and b) the completed modified second network slice subnet instance.

15. The second node according to claim 14, being further configured to:
provide, based on the data provided by the activated one of: a) the completed created second network slice subnet instance and b) the completed modified second network slice subnet instance, an indication to the first node, the indication indicating that monitoring of the second performance has been completed.

16. The second node according to claim 14, wherein the sector of the communications network comprises Internet-of-Things sensors.

* * * * *